(12) United States Patent
Pan

(10) Patent No.: US 11,887,261 B2
(45) Date of Patent: Jan. 30, 2024

(54) SIMULATION OBJECT IDENTITY RECOGNITION METHOD, RELATED APPARATUS, AND SYSTEM

(71) Applicant: Huawei Technologies Co., Ltd., Shenzhen (CN)

(72) Inventor: Linghan Pan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 17/620,424

(22) PCT Filed: Jun. 19, 2020

(86) PCT No.: PCT/CN2020/096933
§ 371 (c)(1),
(2) Date: Dec. 17, 2021

(87) PCT Pub. No.: WO2020/253800
PCT Pub. Date: Dec. 24, 2020

(65) Prior Publication Data
US 2022/0351469 A1 Nov. 3, 2022

(30) Foreign Application Priority Data
Jun. 21, 2019 (CN) .......................... 201910543117.7

(51) Int. Cl.
*G02B 27/01* (2006.01)
*G06T 19/00* (2011.01)
*G06F 3/01* (2006.01)

(52) U.S. Cl.
CPC .......... *G06T 19/006* (2013.01); *G02B 27/017* (2013.01); *G06F 3/013* (2013.01); *G06F 3/016* (2013.01); *G06F 3/017* (2013.01)

(58) Field of Classification Search
CPC .......... G06F 3/017; G06F 3/013; G06F 3/016; G06T 19/006; G02B 27/017
See application file for complete search history.

(56) References Cited

U.S. PATENT DOCUMENTS

| | | | |
|---|---|---|---|
| 9,331,856 | B1 | 5/2016 | Song |
| 2012/0188256 | A1 | 7/2012 | Lee et al. |
| 2013/0120224 | A1* | 5/2013 | Cajigas .............. G02B 27/0172 345/8 |
| 2016/0188861 | A1 | 6/2016 | Todeschini |
| 2018/0059901 | A1 | 3/2018 | Gullicksen |
| 2018/0261011 | A1 | 9/2018 | Kollencheri Puthenveettil |
| 2019/0251622 | A1 | 8/2019 | Wiedmeyer et al. |
| 2021/0016174 | A1* | 1/2021 | Yang ....................... A63F 13/69 |

FOREIGN PATENT DOCUMENTS

| | | |
|---|---|---|
| CN | 102483856 A | 5/2012 |
| CN | 105681316 A | 6/2016 |
| CN | 107463245 A | 12/2017 |

(Continued)

*Primary Examiner* — Weiming He
(74) *Attorney, Agent, or Firm* — Conley Rose, P.C.

(57) ABSTRACT

A simulation object identity recognition method includes displaying, by an electronic device, a simulation object, determining, by the electronic device, whether the simulation object is valid, and notifying by the electronic device, a user of a determining result to improve a user alertness and to avoid disclosing personal information by the user under inducement of an invalid simulation object.

20 Claims, 25 Drawing Sheets

(56) References Cited

FOREIGN PATENT DOCUMENTS

| | | | |
|---|---|---|---|
| CN | 107977834 | A | 5/2018 |
| CN | 109643527 | A | 4/2019 |
| CN | 109791446 | A | 5/2019 |
| CN | 110348198 | A | 10/2019 |
| EP | 3495949 | A1 | 6/2019 |
| WO | 2018024252 | A1 | 2/2018 |
| WO | 2019040065 | A1 | 2/2019 |

* cited by examiner

SIMULATION OBJECT IDENTITY RECOGNITION METHOD, RELATED APPARATUS, AND SYSTEM

CROSS-REFERENCE TO RELATED APPLICATIONS

This is a U.S. National Stage of International Patent Application No. PCT/CN2020/096933 filed on Jun. 19, 2020, which claims priority to Chinese Patent Application No. 201910543117.7 filed on Jun. 21, 2019. Both of the aforementioned applications are hereby incorporated by reference in their entireties.

TECHNICAL FIELD

This application relates to computer graphics technologies and identity recognition technologies, and in particular, to a simulation object identity recognition method, a related apparatus, and a system.

BACKGROUND

With development of computer graphics technologies, technologies such as virtual reality (virtual reality, VR), augmented reality (augmented reality, AR), and mixed reality (mixed reality, MR) are gradually applied to people's lives.

The YR generates a virtual world in three dimensions through computer simulation, provides a simulation effect of a sense such as vision for a user, makes the user feel as if the user is in the real world, and allows the user to interact with the simulated virtual world.

The AR is a technology that integrates real-world information and virtual-world information, and superimposes, onto the real world through analog simulation performed based on science and technology such as computers, physical information that is difficult to experience in a specific time and space range of the real world, for example, visual information, sound, taste, and touch, so that the user can obtain sensory experience beyond reality.

The MR mixes the real world and the virtual world together to create a new visualization environment. The environment includes both the real-world information and the virtual-world information. The real world and the virtual world can interact in real time.

When an electronic device such as a VR/AR helmet or AR glasses displays a virtual image by using the technology such as the VR, AR, or MR, because a computing capability of the electronic device is limited, the virtual image may be generated by another device such as a mobile phone or a server. The virtual image may be replaced in a process in which the mobile phone or the server sends the virtual image to the electronic device. Consequently, a virtual image finally presented by the electronic device is not secure or valid. Therefore, it is necessary to propose a technical solution to identify whether the virtual image presented by the electronic device is secure or valid, to avoid a possible security risk.

SUMMARY

This application provides a simulation object identity recognition method, a related apparatus, and a system, so as to present a secure virtual world to a user. In this way, user privacy is protected and use security of an electronic device is improved.

According to a first aspect, an embodiment of this application provides a simulation object identity recognition method, and the method is applied to an electronic device. The method may include: An electronic device displays a simulation object by using a display apparatus, where the simulation object is a virtual image generated by using a computer graphics technology; the electronic device determines whether the simulation object is valid; and the electronic device outputs first prompt information in response to a result of determining whether the simulation object is valid, where the first prompt information is used to indicate whether the simulation object is valid, where a simulation object that is registered with a registration device corresponding to the electronic device is a valid simulation object, and a simulation object that is not registered with the registration device corresponding to the electronic device is an invalid simulation object.

According to the method in the first aspect, the electronic device may prompt a user whether the currently displayed simulation object is the valid simulation object. When the simulation object is invalid, alertness of the user can be improved, disclosure of personal information by the user under inducement of the invalid simulation object can be avoided, and operation security of the user can be ensured. In this way, user privacy is protected and use security of the electronic device is improved.

With reference to the first aspect, in some embodiments, the registration device performs a registration operation for the simulation object generated by a device that is trusted by the electronic device. In other words, the simulation object generated by the device that is trusted by the electronic device is valid, and a simulation object generated by a device that is not trusted by the electronic device is invalid. Devices that are trusted by the electronic device may include: 1. The electronic device itself, such as VR/AR/MR glasses. 2. Other devices to which the electronic device is connected, for example, a mobile phone to which the electronic device is connected. 3. A server provided by a manufacturer of the electronic device. 4. A server provided by a developer of a VR/AR/MR application installed on the electronic device.

With reference to the first aspect, in some embodiments, the display apparatus of the electronic device may have the following two implementations.

1. The display apparatus is a display. The electronic device displays the simulation object by using the display.

2. The display apparatus includes an optical apparatus. The electronic device projects, by using the optical apparatus, an optical signal corresponding to the simulation object. In this way, the retinas of the user may receive the optical signal to see the simulation object.

With reference to the first aspect, in some embodiments, the simulation object displayed by the electronic device is generated by the electronic device, or the simulation object is generated by a computing device and sent to the electronic device.

With reference to the first aspect, in some embodiments, the first prompt information output by the electronic device may include one or more of the following: a visual element displayed by the display apparatus, a voice, an indicator feedback, or a vibration feedback. For example, when the displayed simulation object is valid, the electronic device may display text information "valid" on the simulation object, and when the displayed simulation object is invalid, the electronic device may display text information "invalid" on the simulation object.

With reference to the first aspect, in some embodiments, the electronic device may perform, in any one of the following cases, the operation of determining whether the displayed simulation object is valid.

1. When detecting a first operation performed on the simulation object, the electronic device determines, in response to the first operation, whether the simulation object is valid. In some embodiments, the first operation performed on the simulation object includes any one of the following: a gesture input performed on the simulation object, a blinking operation performed on the simulation object, a gaze operation (for example, a gaze operation exceeding preset duration) performed on the simulation object, or a voice instruction (for example, a voice instruction "authentication") used to determine whether the simulation object is valid. In the foregoing first case, the user may independently determine whether to trigger the electronic device to perform authentication on the simulation object.

2. While displaying the simulation object, the electronic device determines whether the simulation object is valid.

3. The electronic device periodically determines whether the simulation object is valid. In the foregoing second and third cases, the electronic device may actively initiate authentication on the simulation object.

With reference to the first aspect, in some embodiments, when determining whether the simulation object is valid, the electronic device may further output second prompt information, where the second prompt information is used to indicate that the electronic device is determining whether the simulation object is valid. Herein, the second prompt information includes one or more of the following: a visual element displayed by the display apparatus, a voice, an indicator feedback, or a vibration feedback.

With reference to the first aspect, in some embodiments, if an authentication result of the simulation object is invalid, the electronic device may actively perform one or more of the following operations on the simulation object.

1. In response to the result of determining that the simulation object is invalid, the electronic device stops displaying the simulation object.

2. The electronic device reports the simulation object in response to the result of determining that the simulation object is invalid. Specifically, the electronic device may send an identifier of the simulation object to an authentication server, so that the authentication server marks the simulation object as the invalid simulation object.

With reference to the first aspect, in some embodiments, if an authentication result of the simulation object is invalid, the electronic device may perform one or more of the following operations on the simulation object under triggering of a user.

1. If the simulation object is an invalid simulation object, the electronic device detects a second operation performed on the simulation object, and stops, in response to the second operation, displaying the simulation object. Herein, the second operation may include any one of the following: a gesture input performed on the simulation object, a blinking operation performed on the simulation object, a gaze operation performed on the simulation object, or a voice instruction used to determine whether the simulation object is valid.

2. If the simulation object is the invalid simulation object, the electronic device detects a third operation performed on the simulation object, and reports the simulation object in response to the third operation. Herein, for a specific operation of reporting the simulation object by the electronic device, refer to related descriptions in the foregoing embodiment. Herein, the third operation may include any one of the following: a gesture input performed on the simulation object, a blinking operation performed on the simulation object, a gaze operation performed on the simulation object, or a voice instruction used to determine whether the simulation object is valid.

With reference to the first aspect, in some embodiments, the electronic device may further display a physical object, and perform: outputting third prompt information, where the third prompt information is used to indicate that the simulation object is the virtual image generated by using the computer graphics technology; and/or the electronic device outputs fourth prompt information, where the fourth prompt information is used to indicate that an object corresponding to the physical object exists in the real world. In this manner, the user may be prompted which are physical objects and which are simulation objects in the images currently displayed by the electronic device. Implementations of the third prompt information and the fourth prompt information are similar to implementations of the first prompt information and the second prompt information. For details, refer to related descriptions.

Herein, the electronic device may display the physical object in any one of the following manners: 1. The display apparatus of the electronic device is a display, and the physical object is displayed on the display, where the physical object is obtained through collection by a camera of the electronic device. 2. The display apparatus of the electronic device includes a transparent lens, and the user directly sees the physical object in the real world through the lens.

With reference to the first aspect, in some embodiments, a process in which the electronic device determines whether the simulation object is valid may specifically include: The electronic device sends an identifier of the simulation object to an authentication server, so that the authentication server determines whether the simulation object is valid; the electronic device receives an authentication result returned by the authentication server, where the authentication result indicates whether the simulation object is valid; and the electronic device determines, based on the authentication result, whether the simulation object is valid.

With reference to the first aspect in some embodiments, the simulation object displayed by the electronic device includes one or more of the following: a simulation person, a simulation animal, a simulation tree, or a simulation building.

According to a second aspect, an embodiment of this application provides a simulation object identity recognition method, and the method is applied to a head wearable device. The method may include: A head wearable device displays a simulation object and a physical object by using a display apparatus, where the simulation object is a virtual image generated by using a computer graphics technology: the head wearable device detects a first operation performed on the simulation object, and in response to the first operation, determines whether the simulation object is valid; the head wearable device outputs second prompt information, where the second prompt information is used to indicate that the head wearable device is determining whether the simulation object is valid: the head wearable device outputs first prompt information in response to a result of determining whether the simulation object is valid, where the first prompt information is used to indicate whether the simulation object is valid; and if the simulation object is an invalid simulation object, the head wearable device detects a second operation performed on the simulation object, and in response to the second operation, stops displaying the simulation object, where a simulation object that is registered with a registration device corresponding to the head wearable device is a valid simulation object, and a simulation object that is not registered with the registration device corresponding to the head wearable device is an invalid simulation object: and the simulation object includes a simulation person or a simulation animal.

Herein, the head wearable device may include but is not limited to AR/MR glasses, an AR/MR head-mounted display device, an AR/MR all-in-one machine, and the like. When the head wearable device displays the simulation object and the physical object by using the display apparatus, the head wearable device may provide an AR/MR display scenario.

According to the method in the second aspect, when providing the AR/MR display scenario, the head wearable device may prompt a user whether the currently displayed simulation object is the valid simulation object. When the simulation object is invalid, alertness of the user can be improved, disclosure of personal information by the user under inducement of the invalid simulation object can be avoided in the AR/MR scenario, and operation security of the user can be ensured. In this way, user privacy is protected and use security of the electronic device is improved.

With reference to the second aspect, in some embodiments, the registration device performs a registration operation for a simulation object generated by a device that is trusted by the head wearable device. In other words, the simulation object generated by the device that is trusted by the head wearable device is valid, and a simulation object generated by a device that is not trusted by the head wearable device is invalid. For the device that is trusted by the head wearable device, refer to related descriptions in the first aspect.

Based on a same inventive concept, for the simulation object recognition method and beneficial effects of the second aspect, refer to the first aspect and the possible method implementations of the first aspect and the brought beneficial effects. Therefore, for implementation of the simulation object recognition method, refer to the first aspect and the possible method implementations of the first aspect. Details are not described herein again.

According to a third aspect, an embodiment of this application provides a graphical user interface on an electronic device, where the electronic device includes a display apparatus, a memory and one or more processors, the one or more processors are configured to execute one or more computer programs stored in the memory, and the graphical user interface includes:

displaying a simulation object, where the simulation object is a virtual image generated by using a computer graphics technology; and outputting first prompt information in response to a result of determining whether the simulation object is valid, where the first prompt information is used to indicate whether the simulation object is valid, where a simulation object that is registered with a registration device corresponding to the electronic device is a valid simulation object, and a simulation object that is not registered with the registration device corresponding to the electronic device is an invalid simulation object.

With reference to the third aspect, in some embodiments, the display apparatus of the electronic device may have the following two implementations.

1. The display apparatus is a display. The graphical user interface specifically includes: displaying the simulation object by using the display.

2. The display apparatus includes an optical apparatus. The graphical user interface specifically includes: projecting, by using the optical apparatus, an optical signal corresponding to the simulation object.

With reference to the third aspect, in some embodiments, the displayed simulation object is generated by the electronic device, or the simulation object is generated by a computing device and sent to the electronic device.

With reference to the third aspect, in some embodiments, the first prompt information includes one or more of the following: a visual element displayed by the display apparatus, a voice, an indicator feedback, or a vibration feedback.

With reference to the third aspect, in some embodiments, the graphical user interface further includes: before outputting the first prompt information, outputting second prompt information, where the second prompt information is used to indicate that the electronic device is determining whether the simulation object is valid, Herein, the second prompt information includes one or more of the following: a visual element displayed by the display apparatus, a voice, an indicator feedback, or a vibration feedback.

With reference to the third aspect, in some embodiments, the graphical user interface further includes: in response to a result of determining that the simulation object is invalid, stopping displaying the simulation object.

With reference to the third aspect, in some embodiments, the graphical user interface further includes: if the simulation object is the invalid simulation object, detecting a second operation performed on the simulation object, and in response to the second operation, stopping displaying the simulation object. Herein, for the second operation, refer to related descriptions in the method in the second aspect.

With reference to the third aspect, in some embodiments, the graphical user interface further includes: displaying a physical object; and outputting third prompt information, where the third prompt information is used to indicate that the simulation object is the virtual image generated by using the computer graphics technology, and/or outputting fourth prompt information, where the fourth prompt information is used to indicate that an object corresponding to the physical object exists in the real world. Herein, for the third prompt information and the fourth prompt information, refer to the related descriptions in the method in the second aspect.

According to a fourth aspect, an embodiment of this application provides a graphical user interface on a head wearable device. The head wearable device includes a display apparatus, a memory, and one or more processors, and the one or more processors are configured to execute one or more computer programs stored in the memory. The graphical user interface includes a display physical object and a simulation object, where the simulation object is a virtual image generated by using a computer graphics technology; detecting a first operation performed on the simulation object, and in response to the first operation, determining whether the simulation object is valid;

outputting second prompt information, where the second prompt information is used to indicate that the head wearable device is determining whether the simulation object is valid; and outputting first prompt information in response to a result of determining whether the simulation object is valid, where the first prompt information is used to indicate whether the simulation object is valid; and if the simulation object is an invalid simulation object, detecting a second operation performed on the simulation object, and in response to the second operation, stopping displaying the simulation object, where a simulation object that is registered with a registration device corresponding to the head wearable device is a valid simulation object, and a simulation object that is not registered with the registration device corresponding to the head wearable device is an invalid simulation object, and the simulation object includes a simulation person or a simulation animal.

Based on a same inventive concept, for the graphical user interface of the fourth aspect and beneficial effects of the graphical user interface, refer to the first aspect, the possible implementations of the first aspect, and brought beneficial effects. Therefore, for implementation of the graphical user interface, refer to the first aspect and the possible method implementations of the first aspect. Details are not described herein again.

According to a fifth aspect, an embodiment of this application provides an electronic device. The electronic device is configured to perform the method described in the first aspect. The electronic device includes one or more processors, a memory, and a display apparatus. The memory is coupled to the one or more processors, the memory is configured to store computer program code, the computer program code includes computer instructions, and the one or more processors invoke the computer instructions to enable the electronic device to perform: displaying a simulation object by using the display apparatus, where the simulation object is a virtual image generated by using a computer graphics technology; determining whether the simulation object is valid; and outputting first prompt information in response to a result of determining Whether the simulation object is valid, where the first prompt information is used to indicate whether the simulation object is valid, a simulation object that is registered with a registration device corresponding to the electronic device is a valid simulation object, and a simulation object that is not registered with the registration device corresponding to the electronic device is an invalid simulation object.

With reference to the fifth aspect, in some embodiments, the registration device performs a registration operation for a simulation object generated by a device that is trusted by the electronic device. In other words, the simulation object generated by the device that is trusted by the electronic device is valid, and a simulation object generated by a device that is not trusted by the electronic device is invalid. For the device that is trusted by the electronic device, refer to related descriptions in the first aspect.

Based on a same inventive concept, the electronic device in the fifth aspect may be configured to perform the method in any one of the first aspect or the possible implementations of the first aspect. Therefore, for an operation performed by the electronic device in the fifth aspect and beneficial effects brought by the electronic device, refer to related descriptions in the first aspect or any possible implementation of the first aspect. Details are not described herein again.

According to a sixth aspect, an embodiment of this application provides a head wearable device. The head wearable device is configured to perform the method described in the second aspect. The head wearable device includes one or more processors, a memory, and a display apparatus. The memory is coupled to the one or more processors, the memory is configured to store computer program code, the computer program code includes computer instructions, and the one or more processors invoke the computer instructions to enable the head wearable device to perform: displaying a simulation object and a physical object by using the display apparatus where the simulation object is a virtual image generated by using a computer graphics technology; determining whether the simulation object is valid; and outputting first prompt information in response to a result of determining whether the simulation object is valid, where the first prompt information is used to indicate whether the simulation object is valid, a simulation object that is registered with a registration device corresponding to the head wearable device is a valid simulation object, and a simulation object that is not registered with the registration device corresponding to the head wearable device is an invalid simulation object.

With reference to the sixth aspect, in some embodiments, the registration device performs a registration operation for a simulation object generated by a device that is trusted by the head wearable device. In other words, the simulation object generated by the device that is trusted by the head wearable device is valid, and a simulation object generated by a device that is not trusted by the head wearable device is invalid. For the device that is trusted by the head wearable device, refer to related descriptions in the second aspect.

Based on a same inventive concept, the head wearable device in the sixth aspect may be configured to perform the method in any one of the first aspect or the possible implementations of the first aspect. Therefore, for an operation performed by the head wearable device in the sixth aspect and beneficial effects brought by the head wearable device, refer to related descriptions in the first aspect or any possible implementation of the first aspect. Details are not described herein again.

According to a seventh aspect, an embodiment of this application provides a simulation object identity recognition system. The system includes: an electronic device, a registration device, and an authentication server. The registration device is configured to register a simulation object. The electronic device is configured to display the simulation object by using a display apparatus. The electronic device is the electronic device described in any one of the fifth aspect or the possible implementations of the fifth aspect. The authentication server is configured to determine whether the simulation object displayed by the electronic device is valid. A simulation object that is registered with the registration device is a valid simulation object, and a simulation object that is not registered with the registration device is an invalid simulation object.

According to an eighth aspect, an embodiment of this application provides a simulation object identity recognition system. The system includes: a head wearable device, a registration device, and an authentication server. The registration device is configured to register a simulation object. The head wearable device is configured to display the simulation object by using a display apparatus. The head wearable device is the head wearable device described in any one of the sixth aspect or the possible implementations of the sixth aspect. The authentication server is configured to determine whether the simulation object displayed by the head wearable device is valid. A simulation object that is registered with the registration device is a valid simulation object, and a simulation object that is not registered with the registration device is an invalid simulation object.

According to a ninth aspect, an embodiment of this application provides a computer program product including instructions. When the computer program product runs on an electronic device, the electronic device is enabled to perform the method described in any one of the first aspect or the possible implementations of the first aspect.

According to a tenth aspect, an embodiment of this application provides a computer-readable storage medium, including instructions. When the instructions are run on an electronic device, the electronic device is enabled to perform the method described in any one of the first aspect or the possible implementations of the first aspect.

According to an eleventh aspect, an embodiment of this application provides a computer program product including instructions. When the computer program product runs on an electronic device, the electronic device is enabled to perform the method described in any one of the second aspect or the possible implementations of the second aspect.

According to a twelfth aspect, an embodiment of this application provides a computer-readable storage medium, including instructions. When the instructions are run on an electronic device, the electronic device is enabled to perform the method described in any one of the second aspect or the possible implementations of the second aspect.

According to the technical solutions provided in this embodiment of this application, when displaying a simulation object, the electronic device may prompt a user whether the currently displayed simulation object is a valid simulation object. When the simulation object is invalid, alertness of the user can be improved, disclosure of personal information by the user under inducement of the invalid simulation object can be avoided, and operation security of the user can be ensured. In this way, user privacy is protected and use security of the electronic device is improved.

DESCRIPTION OF EMBODIMENTS

Figure 1:
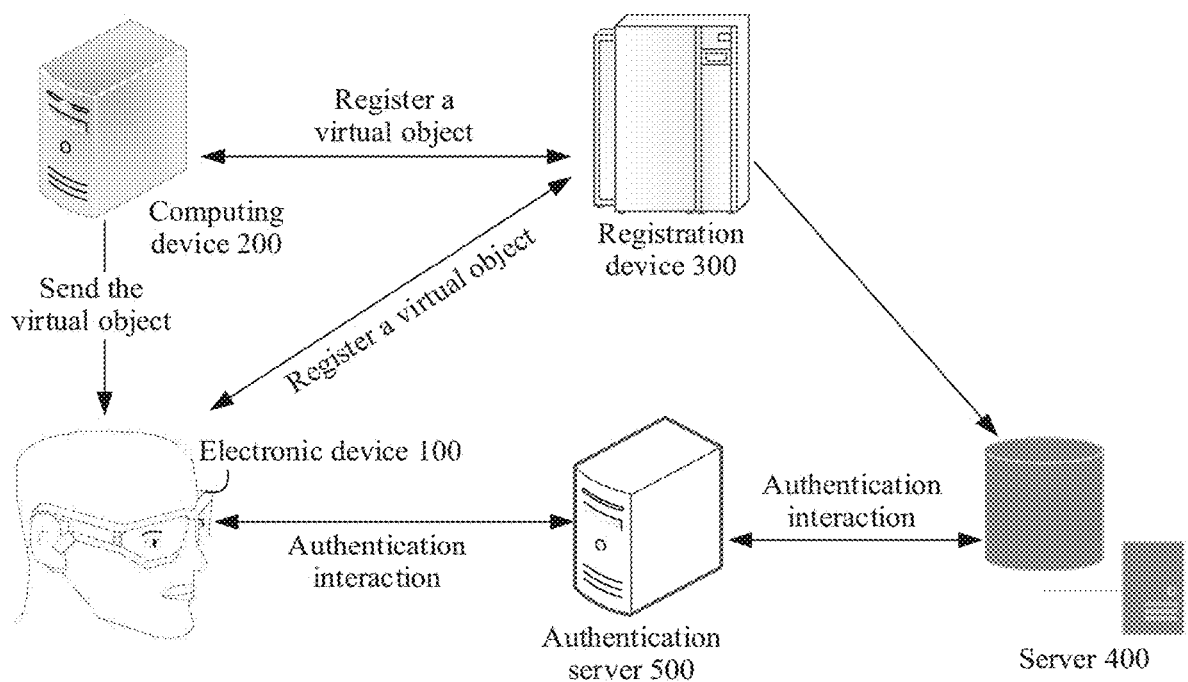
FIG. 1 is a schematic structural diagram of a simulation object identity recognition system according to an embodiment of this application.

The following describes the technical solutions in the embodiments of this application with reference to the accompanying drawings in the embodiments of this application.

In description of the embodiments of this application, "/" means "or" unless otherwise specified. For example, A/B may represent A or B. In this specification, "and/or" describes only an association relationship for describing associated objects and represents that three relationships may exist. For example. A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "a plurality of" means two or more than two.

Embodiments of this application provide a simulation object identity recognition method, a related apparatus, and a system. When displaying the simulation object by using technologies such as VR, AR, and MR, an electronic device may identify whether the simulation object is valid. The electronic device may notify a user of a recognition result, and may further process an identified invalid simulation object. The processing of the invalid simulation object by the electronic device may include: stopping displaying the invalid simulation object, or reporting the invalid simulation object. According to the method provided in this embodiment of this application, a secure virtual world can be presented to the user. In this way, user privacy is protected and use security of the electronic device is improved.

In the following embodiments of this application, the simulation object is a virtual image generated and displayed by rendering by using a computer graphics technology, a computer simulation technology, a display technology, or the like, and may alternatively be referred to as a virtual object or a virtual element. The simulation object is a false image rather than a real image of the physical world. The simulation object may be a virtual object that mimics an object existing in the real world, and may bring immersive experience to the user, A category of the simulation object is not limited in this application. The simulation objects may include a simulation animal, a simulation person, a simulation tree, a simulation building, a virtual label, a landscape, text information, an icon, a picture, a video, or the like. Simulation objects can be two-dimensional or three-dimensional.

In this embodiment of this application, a simulation object that is registered with a registration device corresponding to the electronic device is a valid simulation object, and a simulation object that is not registered with the registration device corresponding to the electronic device is an invalid simulation object. In some embodiments, the registration device performs a registration operation for a simulation object generated by a device that is trusted by the electronic device. In other words, the simulation object generated by the device that is trusted by the electronic device is valid and a simulation object generated by a device that is not trusted by the electronic device is invalid.

Devices trusted by the electronic device may include: 1. The electronic device itself, for example, VR/AR/MR glasses, a VR/AR/MR head-mounted display device, and a VR/AR/MR all-in-one machine. 2. Other devices to which the electronic device is connected. For example, the electronic device is connected to a mobile phone, a tablet computer, or a personal computer in a wireless or wired manner. 3. A server provided by a manufacturer of the electronic device, for example, a server that is provided by Huawei (HUAWEI), a manufacturer of Huawei VR/AR/MR head-mounted display devices, and that is used to generate simulation objects. 4. A server provided by a developer of a VR/AR/MR application installed on the electronic device, for example, a server provided by a developer of a VR/AR/MR application (for example, a YR game application or an AR navigation application) installed on the electronic device. In some embodiments, the valid simulation object may alternatively be referred to as a secure simulation object, and the invalid simulation object may alternatively be referred to as an insecure simulation object.

It may be understood that after the electronic device displays the simulation objects, the user may see the simulation objects (for example, the simulation person) and interact with the simulation objects. Specifically, the user may walk or drive (for example, navigate), input information into the electronic device, swing a body, or the like under an instruction of the simulation object. For example, if the simulation object is the simulation person, when the simulation person attempts to interact with the user, the electronic device may invoke a speaker to play a voice "Hello, what's your name?" In addition, a microphone of the electronic device is invoked to collect voice information (for example, a name of the user) entered by the user in response to the voice. In other words, the simulation person may induce the user to disclose personal information.

It may be understood that the simulation object generated by the device that is trusted by the electronic device is secure and reliable, and an operation performed by the user under an instruction of such a simulation object is secure. For example, information entered by the user to the electronic device is not disclosed, or a route during navigation is accurate. However, security of the simulation object generated by the device that is not trusted by the electronic device cannot be ensured, and security of an operation performed by the user under an instruction of such a simulation object cannot be ensured. For example, information entered by the user to the electronic device may be disclosed, or a route during navigation may be inaccurate. Therefore, in this embodiment of this application, the electronic device notifies the user of a recognition result, so that alertness of the user can be improved, and operation security of the user can be ensured, in this way, user privacy is protected and use security of the electronic device is improved.

The following first describes a simulation object identity recognition system in the embodiments of this application. Simulation objects involved in the simulation object identity recognition system may include simulation objects generated by using a technology such as VR, AR, or MR. Refer to FIG. 1. The simulation object identity recognition system may include an electronic device 100, a computing device 200 configured to generate a simulation object, a registration device 300, a server 400, and an authentication server 500.

The electronic device 100 and the computing device 200 may form a VR/AR/MR display system.

In this embodiment of this application, the electronic device 100 is a terminal device that may display a simulation object by using a technology such as VR/ARIMR, to provide a display environment such as VR/AR/MR for the user.

In some embodiments, the electronic device 100 may present the simulation object by using a VR technology, so that the user feels a completely simulated virtual world. In other words, the electronic device 100 may provide the VR display environment for the user.

In some other embodiments, the electronic device 100 may superimpose and present the simulation object onto a real object actually existing in the physical world by using the technology such as AR/MIR, so that the user feels an augmented reality effect. In other words, the electronic device 100 may provide the AR/SIR display environment for the user. Herein, the real object actually existing in the physical world may be captured by a camera of the electronic device 100, or may be directly seen by the user's eyes.

The simulation object presented by the electronic device 100 may be generated by the electronic device 100 by using a technology such as a computer graphics technology or a computer simulation technology, or may be generated by another computing device 200 connected to the electronic device 100 by using a technology such as a computer graphics technology or a computer simulation technology and sent to the electronic device 100. The computing device 200 may be the server shown in FIG. 1, or may be a mobile phone, a computer, or the like to which the electronic device 100 is connected or with which the electronic device 100 paired. In other words, in some embodiments, the electronic device 100 may be used together with the computing device 200, and the computing device 200 is configured to generate and provide a simulation object for the electronic device 100.

The simulation object presented by the electronic device 100 may interact with the user. In some embodiments, the user may interact with the simulation object presented by the electronic device 100 in an interaction manner such as hard/arm movement, head movement, or eyeball rotation. In some other embodiments, the electronic device 100 may be used together with a handheld device (not shown in FIG. 1), and the user may perform, by controlling the handheld device, interaction with the simulation object presented by the electronic device 100. The handheld device may be, for example, a controller, a gyro mouse, or another handheld computing device. The handheld device may be configured with a plurality of sensors, such as an acceleration sensor, a gyro sensor, a magnetic sensor, and may be configured to detect and track movement of the handheld device. The handheld device may communicate with the electronic device 100 by using a short-range transmission technology such as Bluetooth (Bluetooth), near field communication (near field communication, NFC), or ZigBee.

The electronic device 100 may be mounted on the head of the user, for example, may be VR/AR/MR glasses, a VR/AR/MR head-mounted display (head-mounted display, HMD) device, or a VR/AR/MR all-in-one machine. In some other embodiments of this application, the electronic device 100 may alternatively be a non-portable electronic device such as a desktop computer supporting the VR/AR/MR technology, a smart television, or a vehicle including a display.

In response to a request of the electronic device 100, the computing device 200 may generate a simulation object by using the technology such as the computer graphics technology or the computer simulation technology, and send the generated simulation object to the electronic device 100 for display, so that the electronic device 100 provides the VR/AR/MR display environment for the user. The computing device 200 is a device that is trusted by the electronic device 100. The computing device 200 may be a mobile phone connected to the electronic device 100, a server provided by a manufacturer of the electronic device 100, a server provided by a developer of a VR/AR/MR application installed on the electronic device 100, or the like. It may be understood that when the electronic device 100 may generate the simulation object by using the technology such as the computer graphics technology or the computer simulation technology, the computing device 200 may not be disposed in the simulation object identity recognition system provided in this embodiment of this application.

The registration device 300 is a device that provides a registration service of a virtual object. The registration device 300 is configured to provide a registration service for a valid simulation object. In other words, the registration device 300 is configured to allocate an identifier to the valid simulation object. The identifier is used to indicate the simulation object. For example, the identifier may be a universally unique identifier (universally unique identifier, UUID). The registration device 300 may separately send two pieces of data to the electronic device 100 and the server 400 including a database for storage. The two pieces of data are an identifier allocated to a valid simulation object and a subscriber authentication key (subscriber authentication key; Ki) obtained after the identifier is encrypted by using a first algorithm. In some embodiments, the first algorithm may be a K4 algorithm.

The server 400 and the authentication server 500 may provide an authentication service for the simulation object presented by the electronic device 100.

The server 400 is configured to associatively store the two pieces of data from the registration device 300: the identifier allocated to the valid simulation object, and the Ki obtained after the identifier is encrypted by using the first algorithm. The server 400 further stores a second algorithm and a third algorithm, which are used to authenticate the simulation object. In some embodiments, the second algorithm may be an A3 algorithm, and the third algorithm may be an A8 algorithm.

In this embodiment of this application, the electronic device 100 also associatively stores the two pieces of data from the registration device 300: the identifier allocated to the valid simulation object, and the Ki obtained after the identifier is encrypted by using the first algorithm. The electronic device 100 further stores the second algorithm and the third algorithm, which are used to perform authentication on the simulation object.

The authentication server 500 provides an authentication service for the simulation object displayed by the electronic device 100. Specifically, the authentication server 500 may identify, in response to an authentication request of the electronic device 100 for the simulation object, whether the simulation object is generated by the device that is trusted by the electronic device 100. In other words, the authentication server 500 may perform validity authentication or security authentication on the simulation object, and determine whether the simulation object is valid.

For an authentication process of the simulation object, refer to related descriptions in subsequent embodiments. Details are not described herein.

Figure 2:
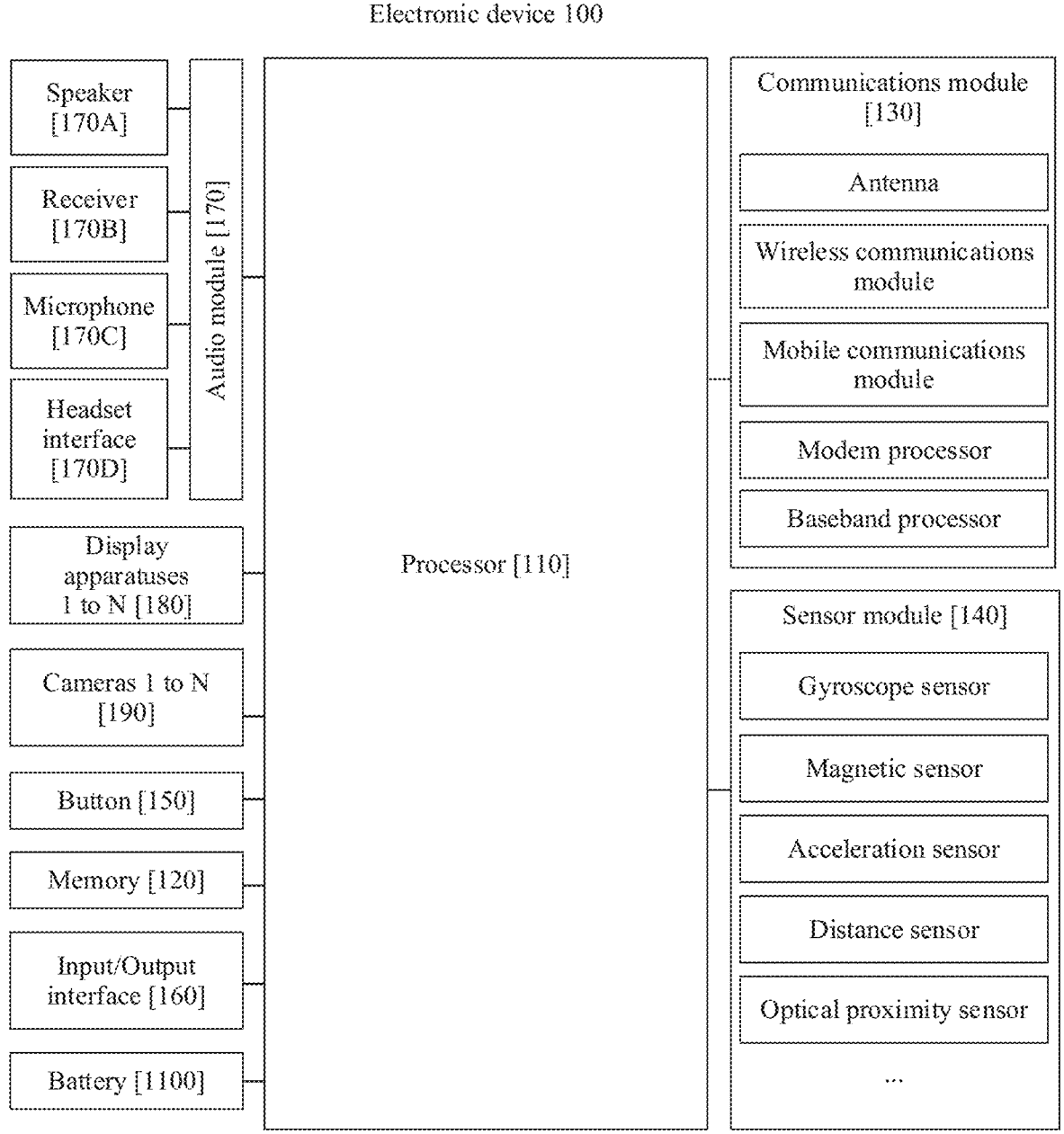
FIG. 2 is a schematic structural diagram of an electronic device according to an embodiment of this application.

The following describes in detail a structure of an example electronic device 100 provided in this embodiment of this application. Refer to FIG. 2, FIG. 2 is a schematic structural diagram of an example electronic device 100 according to this application.

As shown in FIG. 2, the electronic device may include a processor 110, a memory 120, a communications module 130, a sensor module 140, a button 150, an input/output interface. 160, an audio module 170, a speaker 170A, a receiver 170B, a microphone 170C, a headset interface 170D, a display apparatus 180, a camera 190, a battery 1100, and the like.

It may be understood that an example structure in this embodiment of this application does not constitute a specific limitation on the electronic device. In some other embodiments of this application, the electronic device may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a video processing unit (video processing unit, VPU) controller, a memory, a video codec, a digital signal processor (digital signal processor, DSP), a baseband processor, and/or a neural-network processing unit (neural-network processing unit, NPU), and the like. Different processing units may be independent components, or may be integrated into one or more processors.

The controller may be a nerve center and a command center of the electronic device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory, to avoid repeated access and reduce a waiting time of the processor 110. In this way, system efficiency is improved.

In some embodiments, the processor 110 may include one or more interfaces. The interface may include an inter-integrated circuit (inter-integrated circuit, I2C) interface, a universal asynchronous receiver/transmitter (universal asynchronous receiver/transmitter, UART) interface, a mobile industry processor interface (mobile industry processor interface, MIPI), a general-purpose input/output (general-purpose input/output, (MO) interface, a subscriber identity module (subscriber identity module, SIM) interface, and/or a universal serial bus (universal serial bus, USB) interface, a serial peripheral interface (serial peripheral interface, SPI) interface, and the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to a touch sensor, a charger, the camera 190, and the like through different I2C bus interfaces.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to a wireless communications module through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module through a PCM bus interface. In some embodiments, the audio module 170 may alternatively transmit an audio signal to the wireless communications module in the communications module 130 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the communication module 130. For example, the processor 110 communicates with a Bluetooth module in the communication module 130 through the UART interface, to implement a Bluetooth function.

The MIPI interface may be configured to connect the processor 110 to peripheral devices such as the display apparatus ISO and the camera 190. The MIPI interface includes a camera serial interface (camera serial interface, CSI), a display serial interface (display serial interface, DSI), or the like. In some embodiments, the processor 110 communicates with the camera 190 through the CSI, to implement a photographing function of the electronic device. The processor 110 communicates with the display apparatus 180 by using the DSI, to implement a display function of the electronic device.

The GPIO interface may be configured by using software. The GPIO interface may be configured as a control signal, or may be configured as a data signal. In some embodiments, the GPIO interface may be configured to connect the processor 110 to the camera 190, the display apparatus 180, the communications module 130, the sensor module 140, the microphone 170C, and the like. The GPIO interface may be further configured as the I2C interface, the I2S interface, the UART interface, the MIPI interface, or the like.

The USB interface is an interface that conforms to a USB standard specification, and may be specifically a mini USB interface, a micro USB interface, a USB type-C interface, or the like. The USB interface may be configured to connect to the charger to charge the electronic device, or may be configured for data transmission between the electronic device and a peripheral device, or may be configured to connect to a headset, to play audio through the headset. The interface may alternatively be configured to connect to another electronic device such as a mobile phone. The USB interface may be a USB 3.0, and is configured to be compatible with a high-speed display port (display port DP) for signal transmission, and may transmit high-speed audio and video data.

It may be understood that an interface connection relationship between the modules shown in this embodiment of this application is merely an example for description, and does not constitute a limitation on a structure of the electronic device. In some other embodiments of this application, the electronic device may alternatively use an interface connection manner different from an interface connection manner in the foregoing embodiment, or use a combination of a plurality of interface connection manners.

The electronic device may implement a wireless communication function by using the communications module 130. The communications module 130 may include an antenna, a wireless communications module, a mobile communications module, a modem processor, a baseband processor, and the like.

The antenna is configured to transmit and receive electromagnetic wave signals. The electronic device may include a plurality of antennas, and each antenna may be configured to cover a single or a plurality of communication bands. Different antennas may be further multiplexed, to improve antenna utilization. For example, an antenna may be multiplexed as a diversity antenna in a wireless local area network. In some other embodiments, an antenna may be used in combination with a tuning switch.

The mobile communications module may provide a wireless communication solution that includes 2G/3G/4G/5G or the like and that is applied to the electronic device. The mobile communication module may include at least one filter, a switch, a power amplifier, a low noise amplifier (low noise amplifier, LNA), and the like. The mobile communication module may receive an electromagnetic wave through an antenna, perform processing such as filtering and amplifying on the received electromagnetic wave, and transmit the received electromagnetic wave to a modem processor for demodulation. The mobile communication module may further amplify a signal modulated by the modem processor, and convert the signal into an electromagnetic wave through an antenna and radiate the electromagnetic wave. In some embodiments, at least some functional modules of the mobile communication module may be disposed in the processor 110. In some embodiments, at least some functional modules of the mobile communication module and at least some modules of the processor 110 may be disposed in a same device.

The modem processor may include a modulator and a demodulator. The modulator is configured to modulate a to-be-sent low frequency baseband signal into a medium and high frequency signal. The demodulator is configured to demodulate a received electromagnetic wave signal into a low frequency baseband signal. Then, the demodulator transmits the low frequency baseband signal obtained through demodulation to the baseband processor for processing. The baseband processor processes the low-frequency baseband signal, and then transfers an obtained signal to the application processor. The application processor outputs a sound signal through an audio device (not limited to a loudspeaker, or the like), or displays an image or a video through the display apparatus 180. In some embodiments, the modem processor may be an independent device. In some other embodiments, the modem processor may be independent of the processor 110, and may be disposed in a same device with the mobile communication module or other functional modules.

The wireless communications module may provide a wireless communication solution that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device. The wireless communication module may be one or more devices integrating at least one communication processing module. The wireless communication module receives an electromagnetic wave through an antenna, performs frequency modulation and filtering processing on the electromagnetic wave signal, and sends the processed signal to the processor 110. The wireless communication module may further receive a to-be-sent signal from the processor 110, perform frequency modulation and amplification on the to-be-sent signal, and convert the signal into an electromagnetic wave through an antenna and radiate the signal.

In some embodiments, an antenna of the electronic device is coupled to a mobile communications module, so that the electronic device may communicate with a network and another device by using a wireless communications technology. The wireless communication technology may include a global system for mobile communications (global system for mobile communications. GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS) and/or satellite-based augmentation systems (satellite based augmentation systems, SBAS).

The electronic device implements the display function by using the GPU, the display apparatus 180, the application processor, and the like. The GPU is a microprocessor for image processing, and is connected to the display apparatus 180 and the application processor. The GPU is configured to perform mathematical and geometric calculation, and render an image. The processor 110 may include one or more GPUs that execute program instructions to generate or change display information.

In some embodiments, the display apparatus 180 may provide a YR display effect. The display apparatus 180 may provide the VR display effect in the following two manners: 1. In some embodiments, the display apparatus 180 is a display, the display may include a display panel, and a simulation object may be displayed on the display panel of the display apparatus 180. The user can see the simulation object on the display panel to implement the YR display effect. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diodes, QLED), or the like. 2. In some other embodiments, the display apparatus 180 may include an optical apparatus configured to directly project an optical signal (for example, a light beam) onto the retinas of the user, and the user may directly see the simulation object by using the optical signal printed by the optical apparatus. In this way, a BR display effect is implemented. The optical apparatus may be a miniature projector or the like.

In other embodiments, the display apparatus 180 may provide an AR/MR display effect. The display apparatus 180 may provide the AR/MR display effect in the following two manners: 1. In some embodiments, the display apparatus 180 includes a display panel, and the display apparatus ISO may display, on the display panel, a real object actually existing in the physical world, and superimpose and display the simulation object onto the real object. The real object displayed on the display panel may be captured by the camera 190. For materials of the display panel, refer to the foregoing related descriptions. 2. In other embodiments, the display apparatus may include a lens and an optical apparatus. The lens may be transparent, and the user's eyes may see, through the lens, the real object actually existing in the physical world. A material of the lens may be polymethyl methacrylate (polymethyl methacrylate, PMMA), optical plastic, or the like. The optical apparatus may directly project an optical signal onto the retinas of the user, so that the user sees the simulation object. The display apparatus 180 formed by the combination of the lens and the optical apparatus may enable the user to experience the AR/MR display effect.

In the foregoing embodiment, the simulation object presented by the display apparatus 180 to the user may be generated by the electronic device 100 by using a technology such as a computer graphics technology or a computer simulation technology, for example, may be generated by a GPU of the electronic device 100 by using the computer graphics technology or the computer simulation technology. Alternatively, another computing device, such as a mobile phone, a computer, or a server, may generate the simulation object by using the technology such as the computer graphics technology or the computer simulation technology and send the simulation object to the electronic device 100. This is not limited in this application.

There may be two display apparatuses 180 in the electronic device, respectively corresponding to the two eyeballs of the user. Content displayed on the two display apparatuses may be displayed independently. Different images may be displayed on the two display apparatuses to improve a stereoscopic feeling of the images. In some possible embodiments, there may also be one display apparatus 180 in the electronic device, and the display apparatus 180 corresponds to the two eyeballs of the user.

The electronic device may implement a shooting function by using an ISP, a camera 190, a video codec, a GPU, a display apparatus 180, an application processor, and the like.

The ISP is configured to process data fed back by the camera 190. For example, during photographing, a shutter is pressed, and a ray of light is transmitted to a photosensitive element of the camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 190.

The camera 190 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV In some embodiments, the electronic device may include one or N cameras 190, where N is a positive integer greater than 1. The camera 190 may include but is not limited to a conventional color camera (RGB camera), a depth camera (RGB depth camera), a dynamic vision sensor (dynamic vision sensor, DVS) camera, and the like.

In some embodiments, the camera 190 may collect a hand image or a body image of the user, and the processor 110 may be configured to analyze the image collected by the camera 190, to identify a hand action or a body action entered by the user.

In some embodiments, the camera 190 may be used in cooperation with an infrared device (such as an infrared emitter) to detect an eye action of the user, for example, an eyeball gaze direction, a blinking operation, or a gaze operation, to implement eyeball tracking (eyeball tracking).

The digital signal processor is configured to process a digital signal. In addition to processing the digital image signal, the digital signal processor may also process other digital signals. For example, when the electronic device selects a frequency, the digital signal processor is configured to perform Fourier transformation and the like on frequency energy.

The video codec is configured to compress or decompress a digital video. The electronic device may support one or more types of video codecs. In this way, the electronic device can play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor. The NPU quickly processes input information with reference to a structure of a biological neural network, for example, a transfer mode between human brain neurons, and may further continuously perform self-learning. The NPU can implement applications such as intelligent cognition of the electronic device, such as image recognition, facial recognition, speech recognition, and text understanding.

The memory 120 may be configured to store a computer executable program code, where the executable program code includes instructions. The processor 110 runs the instructions stored in the memory 120, to execute various function applications and data processing of the electronic device. The memory 120 may include a program storage area and a data storage area. The program storage area may store an operating system, an application program (for example, a VR/AR/MR application) required by at least one function (for example, a sound playback function or an image playback function), and the like. The data storage area may store data (such as audio data and an address book) created during use of the electronic device, and the like. In addition, the memory 120 may include a high-speed random access memory, and may also include a non-volatile memory, for example, at least one magnetic disk storage device, a flash memory device, or a universal flash storage (universal flash storage, UFS), and the like.

The electronic device may implement audio functions, for example, music playing and recording, by using the audio module 170, the speaker 170A, the microphone 170C, the headset jack 170D, the application processor, and the like.

The audio module 170 is configured to convert digital audio information into an analog audio signal output, and is also configured to convert an analog audio input into a digital audio signal. The audio module may be further configured to encode and decode audio signals. In some embodiments, the audio module may be disposed in the processor 110, or some function modules in the audio module are disposed in the processor 110.

The speaker 170A, also referred to as a "horn", is configured to convert an audio electrical signal into a sound signal. The electronic device may be used to listen to music or answer a call in a hands-free mode over the speaker.

The microphone 170C, also referred to as a "mike" or a "microphone", is configured to convert a sound signal into an electrical signal. At least one microphone 140 may be disposed in the electronic device. In some other embodiments, two microphones 170C may be disposed in the electronic device, to collect a sound signal and implement a noise reduction function. In some other embodiments, three, four, or more microphones 1700 may alternatively be disposed in the electronic device, to collect a sound signal, reduce noise, recognize a sound source, implement a directional recording function, and the like.

In some embodiments, the microphone 1700 may detect a voice signal used to control the portable electronic device. The processor 110 may then process the voice signal to recognize a voice command. For example, when the microphone 170C receives an input voice instruction used to authenticate the simulation object, the electronic device 100 may verify validity of the simulation object.

The headset jack is configured to connect to a wired headset. The headset jack may be a USB interface, or may be a 3.5 mm open mobile terminal platform (open mobile terminal platform, OMTP) standard interface or cellular telecommunications industry association of the USA (cellular telecommunications industry association of the USA, CTIA) standard interface.

In some embodiments, the electronic device may include one or more buttons 150. The buttons may control the electronic device, and provide a user with access to a function on the electronic device. The buttons 150 may be in a form of a button, a switch, a dial, and a touch or near-touch sensing device (such as a touch sensor). Specifically, for example, the user may turn on the display apparatus 180 of the electronic device by pressing the button. The buttons 150 include a power button, a volume button, and the like. The buttons 150 may be a mechanical button, or may be a touch-sensitive button. The electronic device may receive a button input, and generate a button signal input related to a user setting and function control of the electronic device.

In some embodiments, the electronic device may include an input/output interface 160, and the input/output interface 160 may connect another apparatus to the electronic device by using a proper component. The component may include, for example, an audio/video jack, a data connector, and the like.

The sensor module 140 may include a plurality of sensors, for example, an optical proximity sensor, a distance sensor, a gyro sensor, an ambient optical sensor, an acceleration sensor, a temperature sensor, a magnetic sensor, a bone conduction sensor, and a fingerprint sensor.

For example, the optical proximity sensor may include a light-emitting diode (LED) and an optical detector, for example, a photodiode. The light-emitting diode may be an infrared light-emitting diode. The electronic device emits infrared light through the light-emitting diode. The electronic device detects infrared reflected light from a nearby object through the photodiode. When sufficient reflected light is detected, the electronic device may determine that there is the object near the electronic device. When insufficient reflected light is detected, the electronic device may determine that there is no object near the electronic device. The electronic device may detect, by using the optical proximity sensor, a gesture operation at a specific position of the electronic device 100, so as to implement an objective that the gesture operation is associated with an operation command.

The distance sensor may be configured to measure a distance. The electronic device may measure the distance by using an infrared ray or a laser.

The gyro sensor may be configured to determine a motion posture of the electronic device. In some embodiments, angular velocities of the electronic device around three axes (namely, an x-axis, a y-axis, and a z-axis) may be determined by using the gyro sensor. The gyro sensor may also be used for navigation and a somatic game scenario.

The ambient light sensor is configured to sense ambient light luminance. The electronic device may adaptively adjust luminance of the display apparatus 180 based on the sensed ambient light luminance. The ambient light sensor may also be configured to automatically adjust a white balance during photographing.

The acceleration sensor may detect magnitude of accelerations in various directions (usually on the three axes) of the electronic device. When the electronic device is static, a magnitude and a direction of gravity may be detected. The acceleration sensor may be further configured to recognize the posture of the electronic device, and is applied to an application such as a pedometer.

In some embodiments of this application, the electronic device 100 may track movement of the head of the user based on the acceleration sensor, the gyro sensor, a magnetic sensor, or the like.

The temperature sensor is configured to detect a temperature. In some embodiments, the electronic device executes a temperature processing policy based on the temperature detected by the temperature sensor. For example, when the temperature reported by the temperature sensor exceeds a threshold, the electronic device degrades performance of a processor near the temperature sensor, to reduce power consumption and implement thermal protection. In some other embodiments, when the temperature is below another threshold, the electronic device heats the battery 1100 to prevent the electronic device from abnormally shutting down due to the low temperature, in some other embodiments, when the temperature is below still another threshold, the electronic device boosts an output voltage of the battery 1100, to prevent abnormal shutdown due to the low temperature.

A software system of the electronic device 100 may be in a layered architecture, an event-driven architecture, a microkernel architecture, a microservice architecture, a cloud architecture, or the like. This is not limited in this application. For example, the electronic device 100 in this embodiment of this application may run iOS, Android, Microsoft, or another operating system.

Based on the simulation object identity recognition system shown in FIG. 1 and the electronic device 100 shown in FIG. 2, an embodiment of this application provides a simulation object identity recognition method. According to the method provided in this embodiment of this application, when displaying the simulation object by using a technology such as VR, AR, or MR, the electronic device may identify whether the simulation object is valid, may notify the user of a recognition result, and may further process the identified invalid simulation object, so as to present the user with a secure virtual world, According to the method, user privacy can be protected, and use security of the electronic device can be improved.

The following describes a simulation object identity recognition method by using an AR/MR, display scenario provided by the electronic device 100 in this embodiment of this application as an example.

Figure 3A:
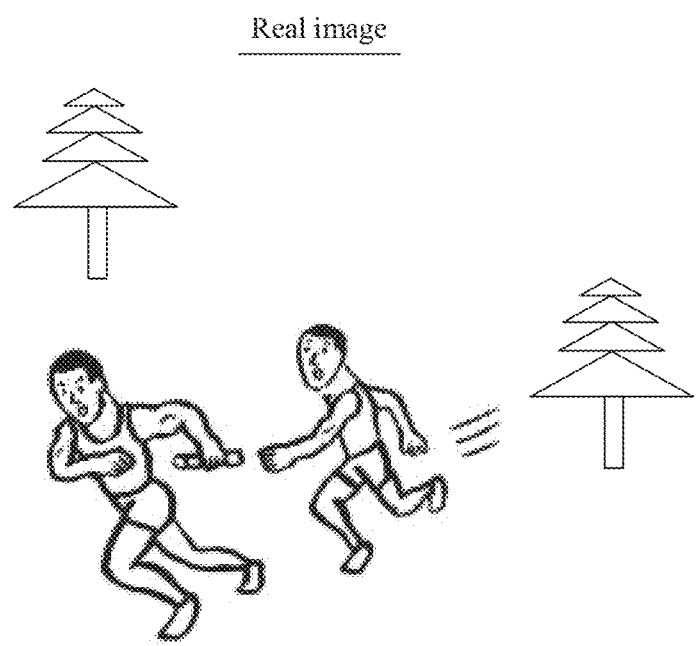
FIG. 3A is a real image according to an embodiment of this application.
Figure 3B:
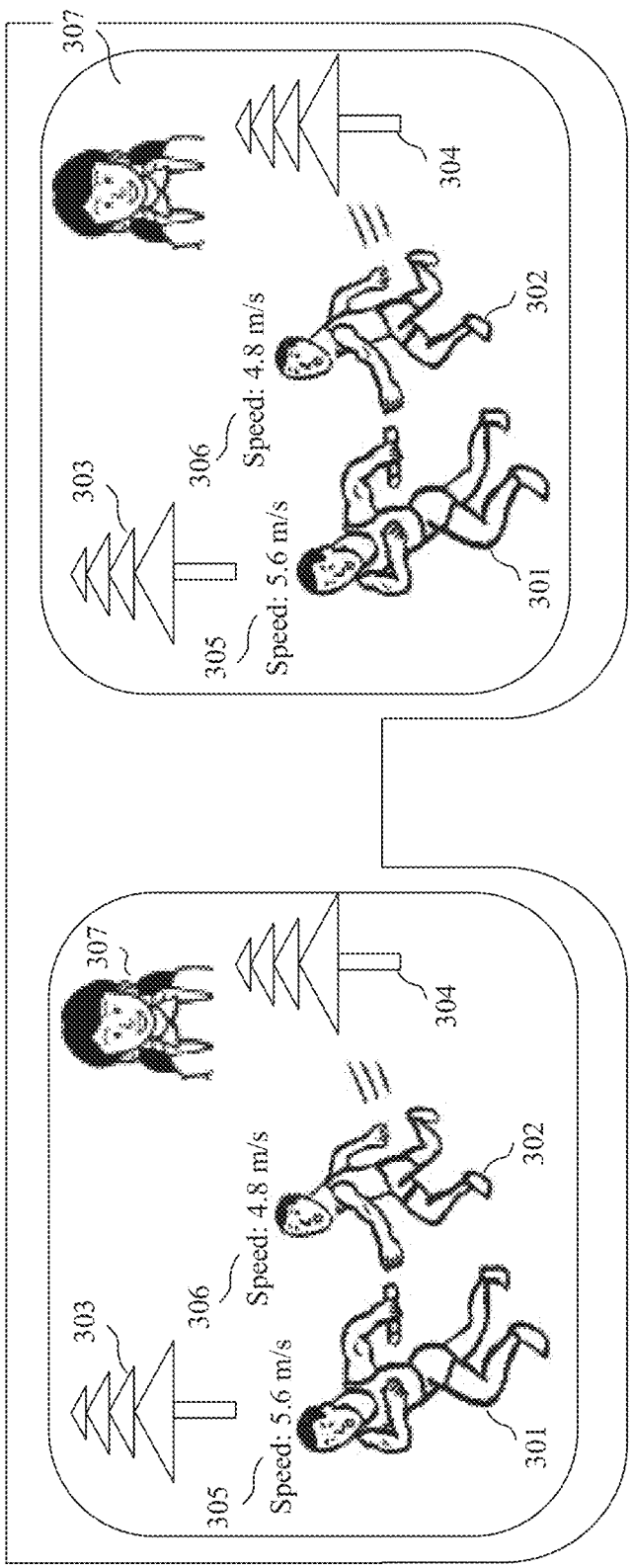
FIG. 3B is a schematic diagram of human-computer interaction according to an embodiment of this application.
Figure 3C:
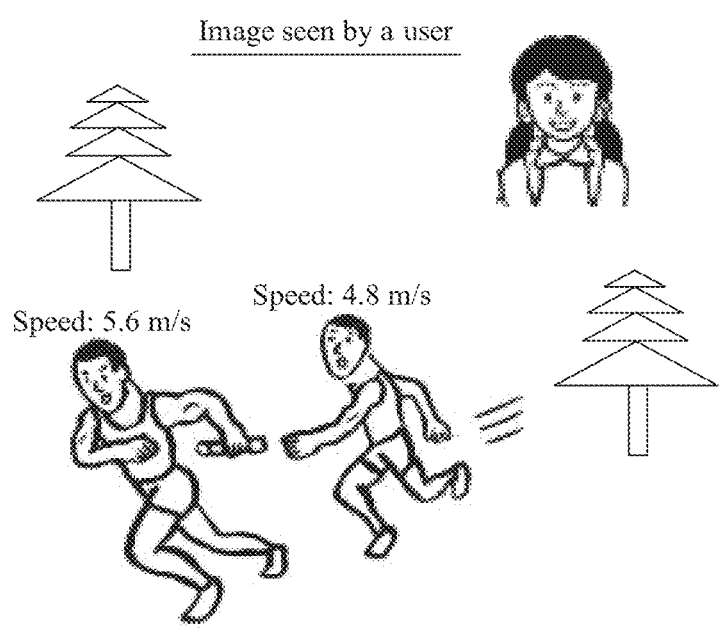
FIG. 3C is an image seen by a user according to an embodiment of this application.

Refer to FIG. 3A to FIG. 3C. FIG. 3A to FIG. 3C show an AR/MR display scenario as an example. In the AR/MR display scenario, the user wears the electronic device 100, and sees, by using the electronic device 100, a simulation object superimposed onto a physical object in the real world.

FIG. 3A shows an example of a real image in a physical world. The real image includes one or more physical objects, such as a running athlete, a tree, and the like.

FIG. 3B shows an example of a user interface 31 provided by the electronic device 100. As shown in FIG. 3B, the electronic device 100 may include two displays. The two displays display: an image 301 of an athlete, an image 302 of an athlete, an image 303 of a tree, an image 304 of a tree, text information 305, text information 306, and a simulation person 307.

Objects corresponding to the image 301 of the athlete, the image 302 of the athlete, the image 303 of the tree, and the image 304 of the tree, such as the athlete and the tree, are physical objects that actually exist in the physical world. The text information 305, the text information 306, and the simulation person 307 are simulation objects provided by the electronic device 100. The simulation object displayed by the electronic device 100 may interact with the user. For example, when displaying the simulation person 307, the electronic device may play a voice by using a speaker, and collect a voice input by a user by using a microphone, so that the user and the simulation person 307 generate voice interaction. This voice interaction enables the user to have a feeling of chatting with the simulation person.

It may be understood that the two displays of the electronic device 100 may display different content, so as to present a three-dimensional visual effect to the user. For example, positions of content displayed on the left and right displays of the electronic device 100 relative to the display may be slightly different.

In the user interface 31 shown in FIG. 3B, an image of a physical object, such as the image of the athlete 301, the image of the athlete 302, the image of the tree 303, or the image of the tree 304, may be captured by the electronic device 100 by using the camera 190. Simulation objects such as the text information 305, the text information 306, and the simulation person 307 may be generated by the electronic device 100 by using a technology such as a computer graphics technology, a computer simulation technology. Alternatively, another computing device, such as a mobile phone, a computer, or a server, may generate the simulation objects by using the technology such as the computer graphics technology or the computer simulation technology, and send the generated simulation objects to the electronic device 100.

FIG. 3C shows an example of an image seen by a user by using the electronic device 100. The left eye of the user sees, by using the display on the left side shown in FIG. 3B, content displayed by the display on the left side. The right eye of the user sees, by using the display on the right side shown in FIG. 3B, content displayed by the display on the right side. A spatial stereoscopic visual effect is generated in the brain. The user may feel the image that the user sees as shown in FIG. 3C. The user may see a physical object in the real world by using the electronic device 100, and may further see a simulation object superimposed onto the physical cal object. In other words, the user may feel an AR/MR display scenario.

This is not limited to the two displays shown in FIG. 3B. In some embodiments, the electronic device 100 may further provide only one display, so that the user sees, by using the electronic device 100, the image shown in FIG. 3C.

This is not limited to the real image that is collected by the camera 190 and that is displayed on the display shown in FIG. 3B. In some embodiments, the electronic device 100 may be further configured with a transparent lens, so that the user can directly see the physical object in the real world by using the lens.

This is not limited to the simulation object directly displayed on the display shown in FIG. 3B. In some embodiments, the electronic device 100 may further be configured with an optical apparatus. The optical apparatus may project an optical signal onto the retinas of the user, so that the user sees the simulation object. In other words, the user may see, by using the electronic device 100, the image shown in FIG. 3C.

In some embodiments, with development of an AR/MR technology and improvement of a hardware apparatus of the electronic device, reality of the simulation object seen by the user by using the electronic device 100 becomes stronger, and the user may not be able to distinguish the physical object presented by the electronic device 100 from the simulation object. In this embodiment of this application, when providing the AR/MR display scenario, the electronic device 100 may prompt the user which are physical objects and which are simulation objects in the currently displayed images.

In this embodiment of this application, the electronic device 100 may determine, in any one of the following manners, whether the displayed object is a physical object or a simulation object.

(1) The electronic device 100 may determine, based on a source of each object in the displayed images, whether the object is a physical object or a simulation object. Specifically, in the images displayed by the electronic device 100, the image captured by using the camera 190 of the electronic device 100 is a physical object actually existing in the physical world, and an image generated only by rendering by the electronic device 100 by using a GPU is a simulation object. Herein, the image generated by the electronic device 100 by rendering by using the GPU may be an image generated by a local end of the electronic device 100 by using a technology such as a computer graphics technology or a computer simulation technology, or may be rendered by the electronic device 100 by using a local GPU after receiving an image generated by another computing device 200.

It should be noted that, in the AR scenario, the electronic device may superimpose the simulation object onto the physical object, and both the simulation object and the physical object that are seen by the user are rendered by the GPU. In this case, an image captured by the camera and then rendered by the GPU is a physical object, and an image presented only by the GPU rendering is a simulation object.

(2) The electronic device 100 may extract a feature of each object in the displayed images, and determine whether the object is a physical object or a simulation object based on the feature of each object. Object features may include a color feature, a texture feature, a shape feature, and the like. In general, features of physical objects are richer than those of simulation objects.

In this embodiment of this application, the electronic device 100 may prompt the user which are physical objects and which are simulation objects in the currently displayed images. The electronic device 100 may prompt the user in the following cases: 1. When providing the AR/MR display scenario for the user, the electronic device 100 may continuously prompt the user which are physical objects and which are simulation objects in the currently displayed images. 2. The electronic device 100 may prompt, within a period of time in which the simulation object is initially displayed, the user that the object is the simulation object. 3. When the user selects an object in the currently displayed images, the electronic device 100 may prompt the user that the object is a simulation object or a physical object. For a manner in which the user selects an object in the currently displayed images, refer to related descriptions in subsequent embodiments. Details are not described herein.

Figure 4A:
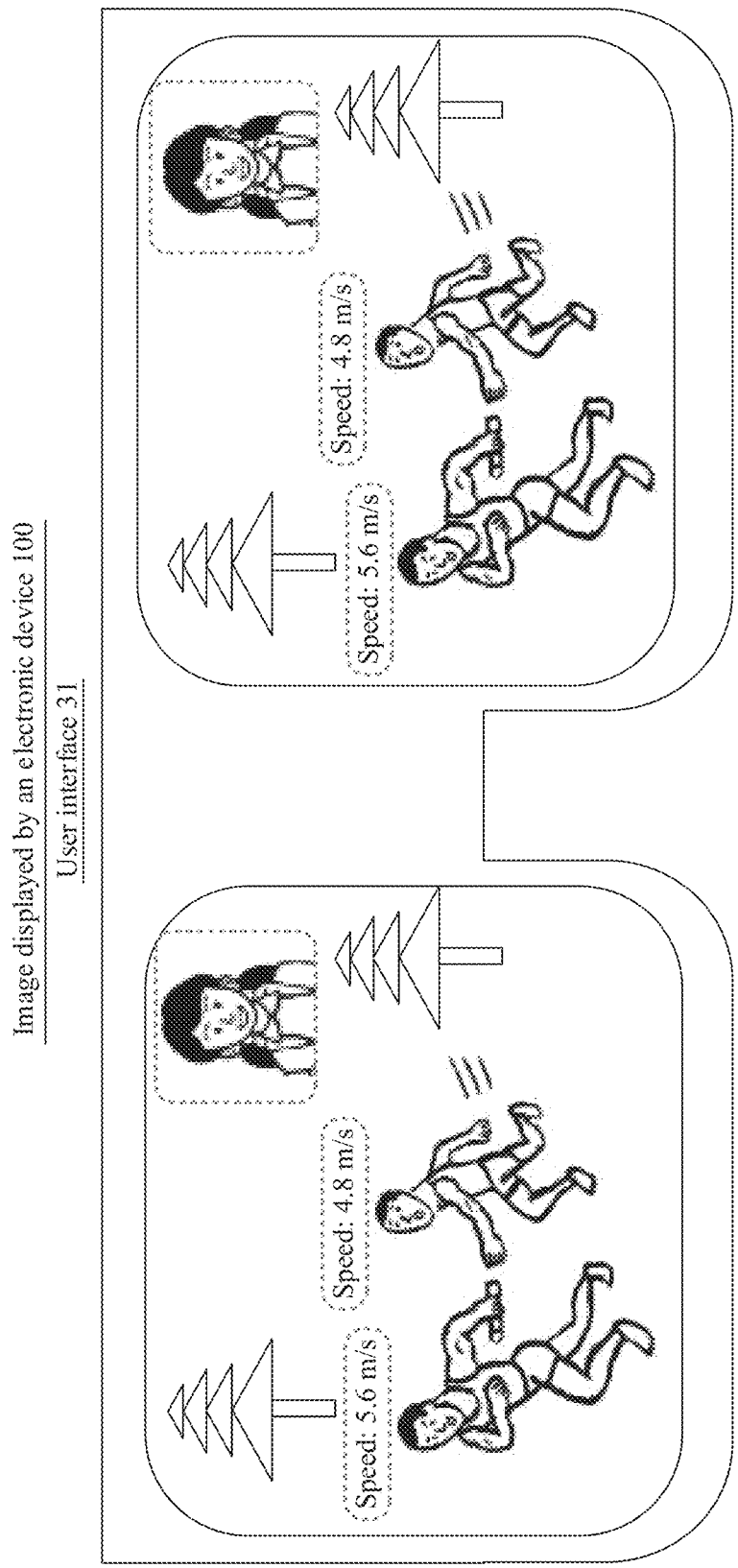
FIG. 4A, FIG. 5A, FIG. 6A, FIG. 7A, FIG. 8A, FIG. 9A, FIG. 9C, FIG. 10A, and FIG. 11A are schematic diagrams of human-computer interaction according to an embodiment of this application.
Figure 4B:
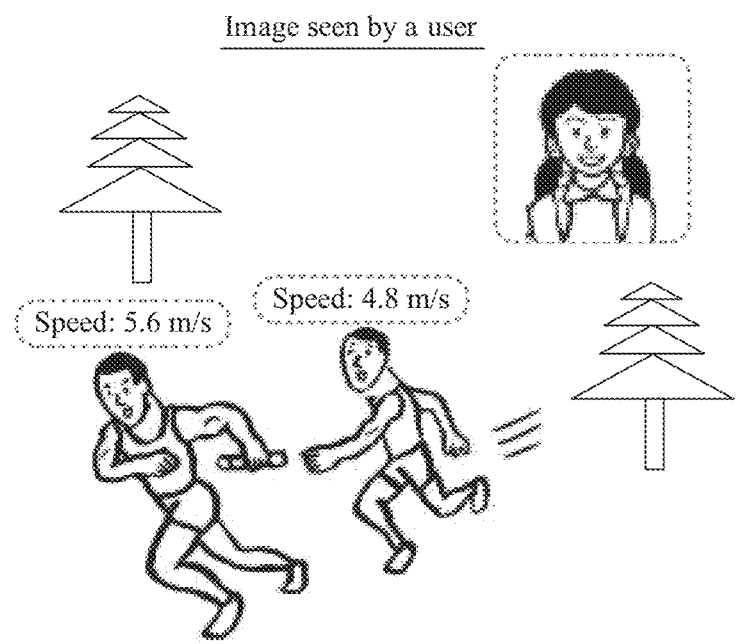
FIG. 4B, FIG. 5B, FIG. 6B, FIG. 7B, FIG. 8B, FIG. 9B, FIG. 9D, FIG. 10B, and FIG. 11B are images seen by a user according to an embodiment of this application.

Refer to FIG. 4A. FIG. 4A shows a possible manner in which the electronic device 100 prompts a user which are physical objects and which are simulation objects in currently displayed images. As shown in FIG. 4A, the electronic device 100 may add a dashed line box around the simulation object displayed in the user interface 31, so as to prompt the user that content displayed in the dashed line box is the simulation object. Refer to FIG. 4B. FIG. 4B is an image seen by a user when the electronic device 100 displays the user interface 31 shown in FIG. 4A. The user may see that a dashed line box is added around the simulation object, so as to accurately distinguish a physical object from a simulation object in the seen images.

This is not limited to the manner of adding the dashed box around the simulation object to prompt the user shown in FIG. 4A and FIG. 4B. In some embodiments, the electronic device 100 may further prompt the user in another display manner. For example, the electronic device 100 may further display the simulation object in an animation effect (for example, discontinuous rather than continuous display of the simulation object), add an icon or text to the simulation object, or add an icon or text to the physical object, to prompt the user which is the physical object and which is the simulation object in the currently displayed images.

This is not limited to a visual display effect. The electronic device 100 may further prompt the user, in a manner such as voice, vibration, or flash, which are physical objects and which are simulation objects in the currently displayed images. For example, the electronic device 100 may be configured with a motor. When the user selects an object in the images displayed by the electronic device 100, if the object is the physical object, the motor may output a vibration feedback; or if the object is the simulation object, the motor may output two vibration feedbacks.

In this embodiment of this application, information used to indicate that the object displayed by the electronic device 100 is the simulation object may be referred to as third prompt information. In other words, the third prompt information may include but is not limited to: a visual element displayed by the electronic device 100, a voice, an indicator feedback, or a vibration feedback.

In this embodiment of this application, information used to indicate that the object displayed by the electronic device 100 is the physical object may be referred to as fourth prompt information. In other words, the third prompt information may include but is not limited to: a visual element displayed by the electronic device 100, a voice, an indicator feedback, or a vibration feedback.

In this embodiment of this application, the electronic device 100 may initiate authentication on the currently displayed simulation object. In other words, the electronic device 100 may identify whether the currently displayed simulation object is a valid simulation object. The electronic device 100 may initiate authentication on the currently displayed simulation object in the following two cases.

(1) In a first case, the electronic device 100 detects an authentication operation for the displayed one or more simulation objects, and in response to the operation, the electronic device 100 authenticates the one or more simulation objects.

First, the user may select or direct to a to-be-authenticated simulation object from the one or more simulation objects displayed by the electronic device 100. The user may select or direct to the to-be-authenticated simulation object in the following manners:

1. The user selects or directs to the to-be-authenticated simulation object through hand movement.

Figure 5A:
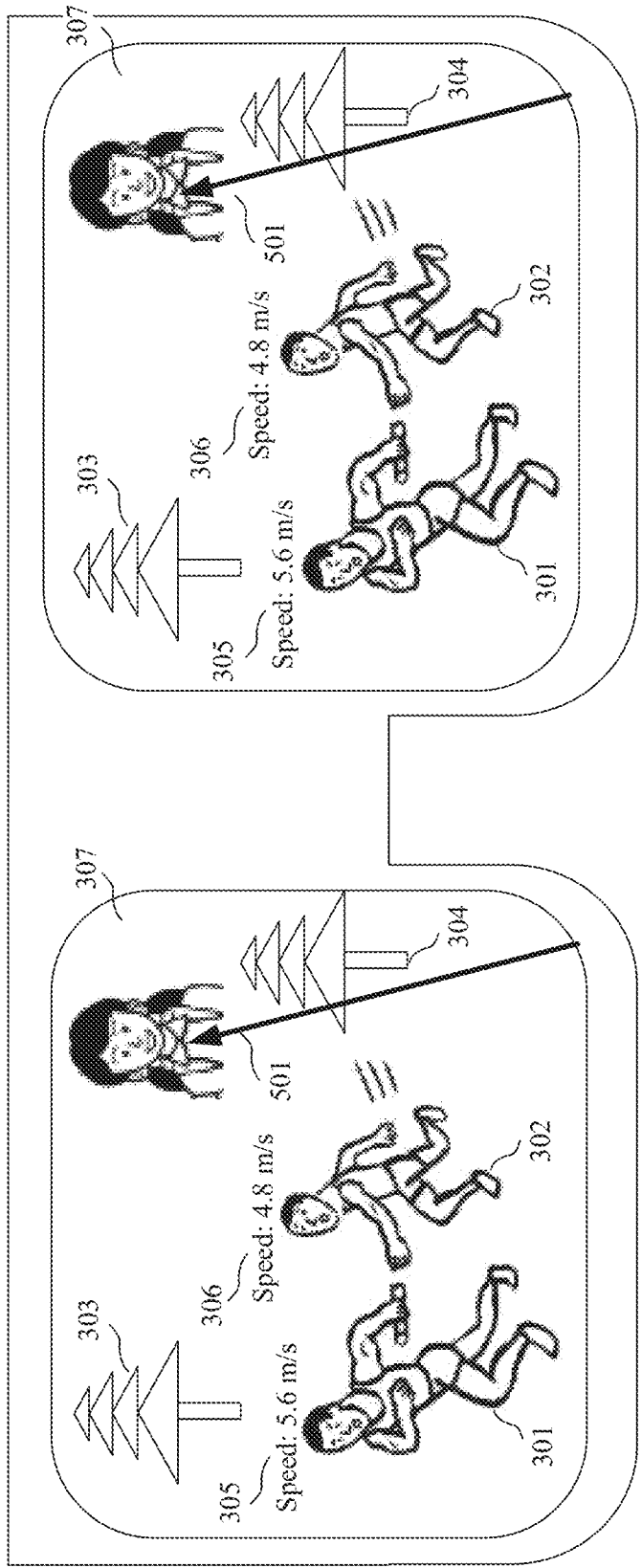
Figure 5A:
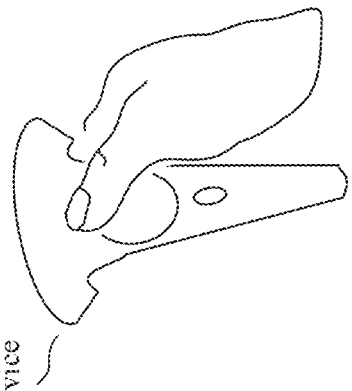

Refer to FIG. 5A, FIG. 5A shows a manner in which a user selects or directs to a to-be-authenticated simulation object through the hand movement. As shown in FIG. 5A, the electronic device 100 may be used together with a handheld device, and movement of the handheld device in the real physical world may be converted into an interactive operation between a user and an object displayed by the electronic device 100, Specifically, the user holds the handheld device to move, and the handheld device may detect and track movement information of the handheld device, and send the movement information to the electronic device 100, so that the electronic device 100 masters movement of the handheld device. Herein, the handheld device may detect and track the movement of the handheld device by using sensors such as an acceleration sensor, a gyro sensor, and a magnetic sensor that are configured. The electronic device 100 may display, on a display based on the movement of the handheld device, simulated prompt information indicating that the simulation object is directed to by using the handheld device. As shown in FIG. 5A, the electronic device 100 may display prompt information 501 in the user interface 31. The prompt information 501 is used to prompt the user that a currently directed or selected simulation object is the simulation person 307. The prompt information 501 may be a light beam in a virtual arrow shape.

Figure 5B:
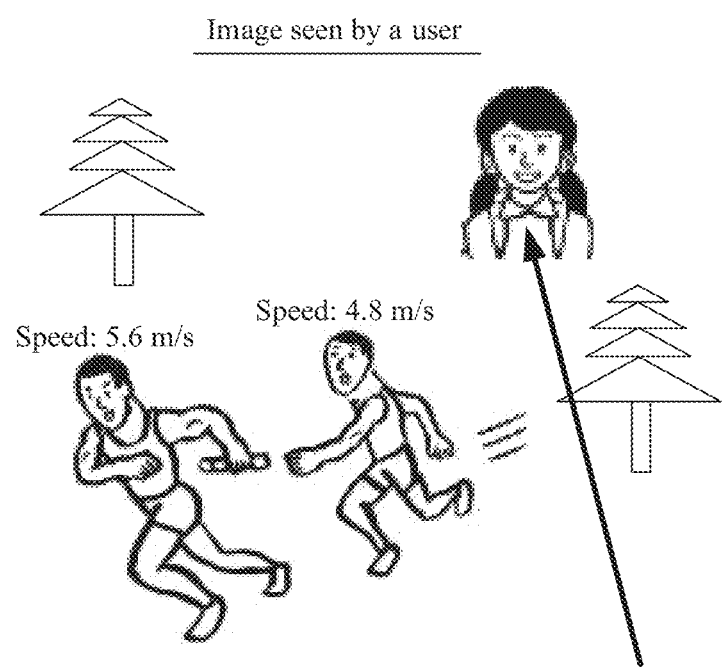

Refer to FIG. 513, FIG. 5B is an image seen by a user when the electronic device 100 displays the user interface 31 shown in FIG. 5A.

This is not limited to the manner in which the user selects or directs to the simulation object by using the handheld device shown in FIG. 5A. In some other embodiments, the electronic device 100 may further convert hand movement of the user into an interaction operation between the user and the simulation object displayed by the electronic device 100. For example, the electronic device 100 may capture, by using the camera 190, images in a hand movement process of the user, and display, on the display based on the images in the hand movement process of the user, simulated prompt information indicating that the simulation object is directed to through the hand movement of the user.

2. The user selects or directs to the to-be-authenticated simulation object through eyeball movement.

Figure 6A:
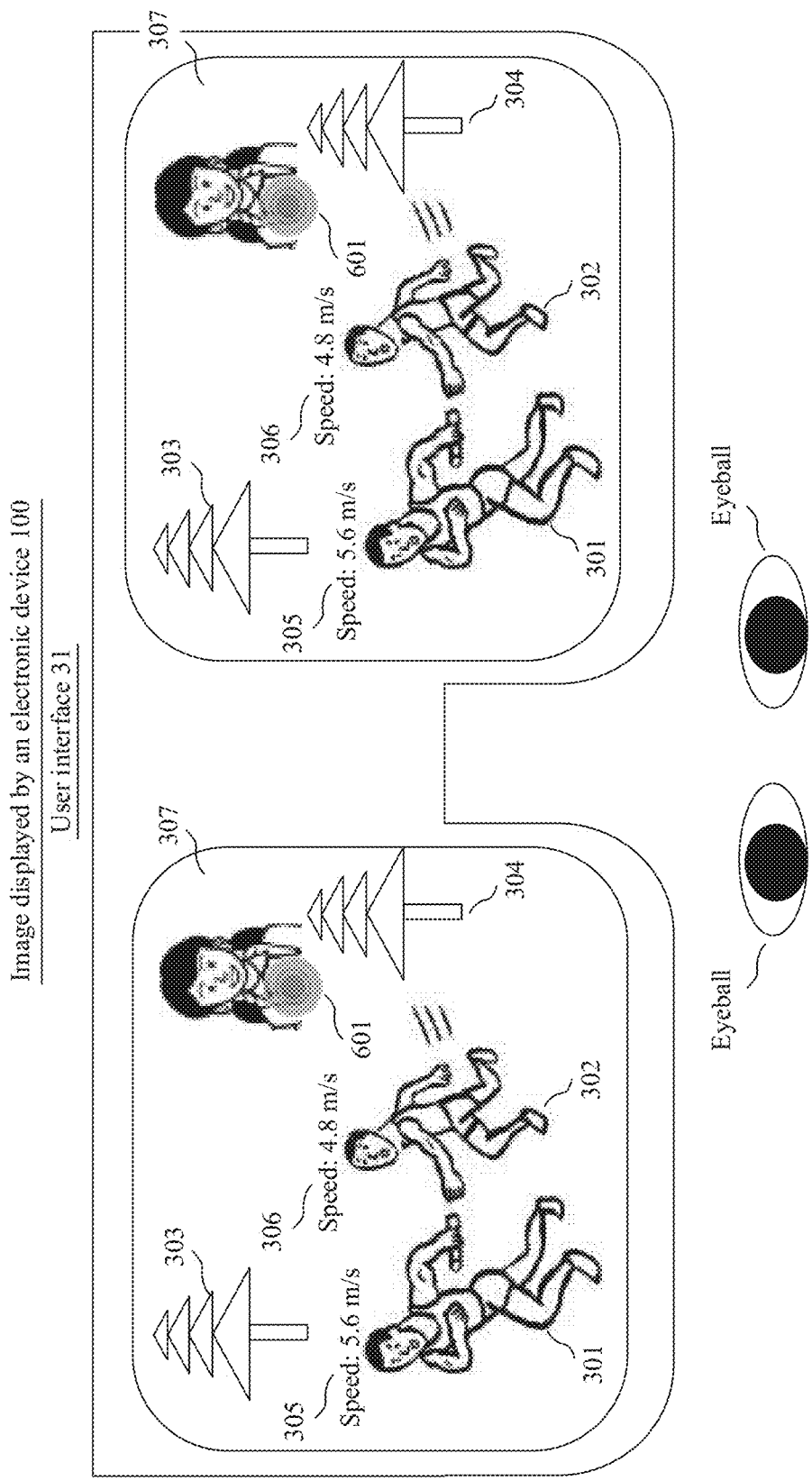
Figure 6B:
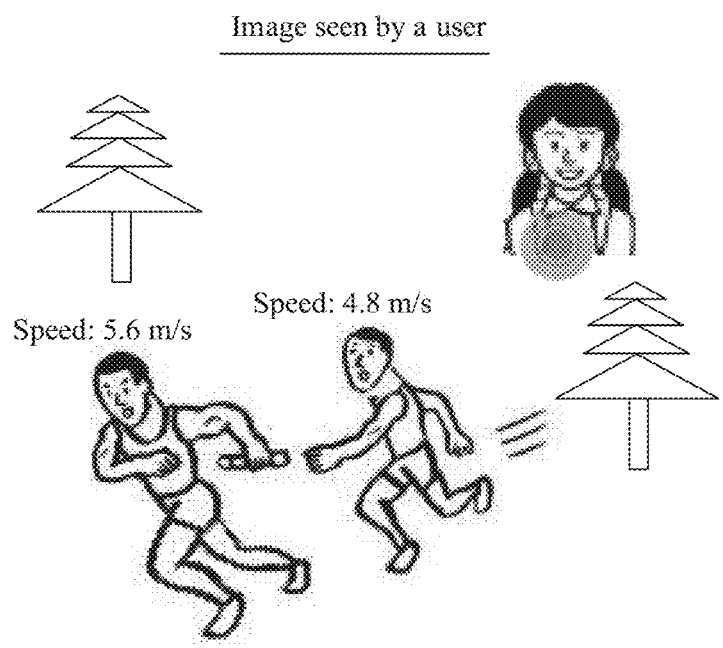

Refer to FIG. 6A. FIG. CA shows a manner in which a user selects or directs to a to-be-authenticated simulation object through eyeball movement. As shown in FIG. CA, user's eyeballs may gaze at a display of the electronic device 100, and rotate the eyeballs to select or direct to the to-be-authenticated simulation object. The electronic device 100 may detect, by using an eyeball tracking (eye tracking) technology and by using an infrared device (for example, an infrared emitter) and/or the camera 190, a position at which the user's eyeballs gaze on the display. As shown in FIG. 6A, the electronic device 100 may display, based on the detected position at which the user's eyeballs gaze on the display, simulated prompt information indicating that the user's eyeballs direct to the simulation object at the position at which the user's eyeballs gaze on the display. As shown in FIG. CA, the electronic device 100 may display prompt information 601 in the user interface 31. The prompt information 601 is used to prompt the user that a currently directed or selected simulation object is the simulation person 307. The prompt information 601 may be a virtual circular icon. Refer to FIG. 6B. FIG. 6B is an image seen by a user when the electronic device 100 displays the user interface 31 shown in FIG. 6A.

This is not limited to the manner of selecting the to-be-authenticated simulation object through the hand movement or eyeball movement. In this embodiment of this application, the to-be-authenticated simulation object may be selected in some other manners. For example, the user may further select, by entering a voice instruction, the to-be-authenticated simulation object, or the like.

After selecting or directing to the to-be-authenticated simulation object, the user may trigger the electronic device 100 to authenticate the simulation object. Operations that the user triggers the electronic device 100 to perform authentication on the selected or directed simulation object may include the following several types.

1. A user enters a user operation (for example, a pressing operation or a touch operation) on a physical button or a virtual button disposed on the electronic device 100 or a handheld device connected to the electronic device 100, and in response to the user operation, the electronic device 100 authenticates the selected or directed simulation object.

For example, for this, refer to FIG. 5A. The user may enter the pressing operation on the physical button on the handheld device, and after detecting the operation, the handheld device sends indication information of the operation to the electronic device 100. In response to the operation, the electronic device 100 authenticates the simulation object 307 that is selected or directed to by the user.

2. The user triggers, by using the eyeball movement, the electronic device 100 to authenticate the simulation object that is selected or directed to by the user. The eyeball movement may include: a gaze operation that is input to the simulation object and that exceeds preset duration, one or more blink operations that are input when the simulation object is gazed, or the like. The electronic device 100 may detect the eyeball movement by using the infrared device and/or the camera 190, and in response to the detected eyeball movement, the electronic device 100 authenticates the selected or directed simulation object.

3. The user may input a voice instruction to the electronic device 100, and the electronic device 100 may detect the voice instruction by using the microphone 1700, and perform, in response to the voice instruction, authentication on the selected or directed simulation object.

This is not limited to the foregoing three manners of triggering the electronic device 100 to perform authentication on the simulation object. The user may further trigger, in another manner, the electronic device 100 to perform authentication on the selected or directed simulation object. This is not limited in this embodiment of this application. For example, in some other embodiments, the user may further simulate, by using the hand movement, a gesture of drawing a circle on the simulation object, to trigger the electronic device 100 to perform authentication on the simulation object.

In this embodiment of this application, the operation used to trigger the electronic device 100 to perform authentication on the simulation object may be referred to as a first operation. In other words, the first operation may include but is not limited to: a gesture input performed on the simulation object, a blinking operation performed on the simulation object, a gaze operation (for example, a gaze operation exceeding preset duration) performed on the simulation object, or a voice instruction (for example, a voice instruction "authentication") used to determine whether the simulation object is valid.

(2) In a second case, the electronic device 100 actively initiates authentication on one or more currently displayed simulation objects.

In some embodiments, the electronic device 100 may perform authentication on a new simulation object each time the new simulation object is displayed. In some other embodiments, the electronic device 100 may further periodically authenticate one or more displayed simulation objects. For example, the electronic device 100 may authenticate all displayed simulation objects every half an hour.

Authentication on the simulation object is not limited to the foregoing two cases. In this embodiment of this application, the electronic device 100 may further initiate authentication on the currently displayed simulation object in another case. For example, the user may further trigger, on a mobile phone connected to or paired with the electronic device 100, the electronic device 100 to authenticate the currently displayed simulation object.

A process in which the electronic device 100 performs authentication on the simulation object involves interaction with the server 400 and the authentication server 500. The authentication process is described in detail in subsequent embodiments. Details are not described herein.

In this embodiment of this application, in a process of authenticating the simulation object, the electronic device 100 may prompt the user that the authentication operation is currently being performed. Manners in which the electronic device 100 prompts the user that the authentication operation is currently being performed may include the following several manners.

1. The electronic device 100 may display prompt information on a display. The prompt information is used to prompt the user that the authentication operation is currently being performed.

Figure 7A:
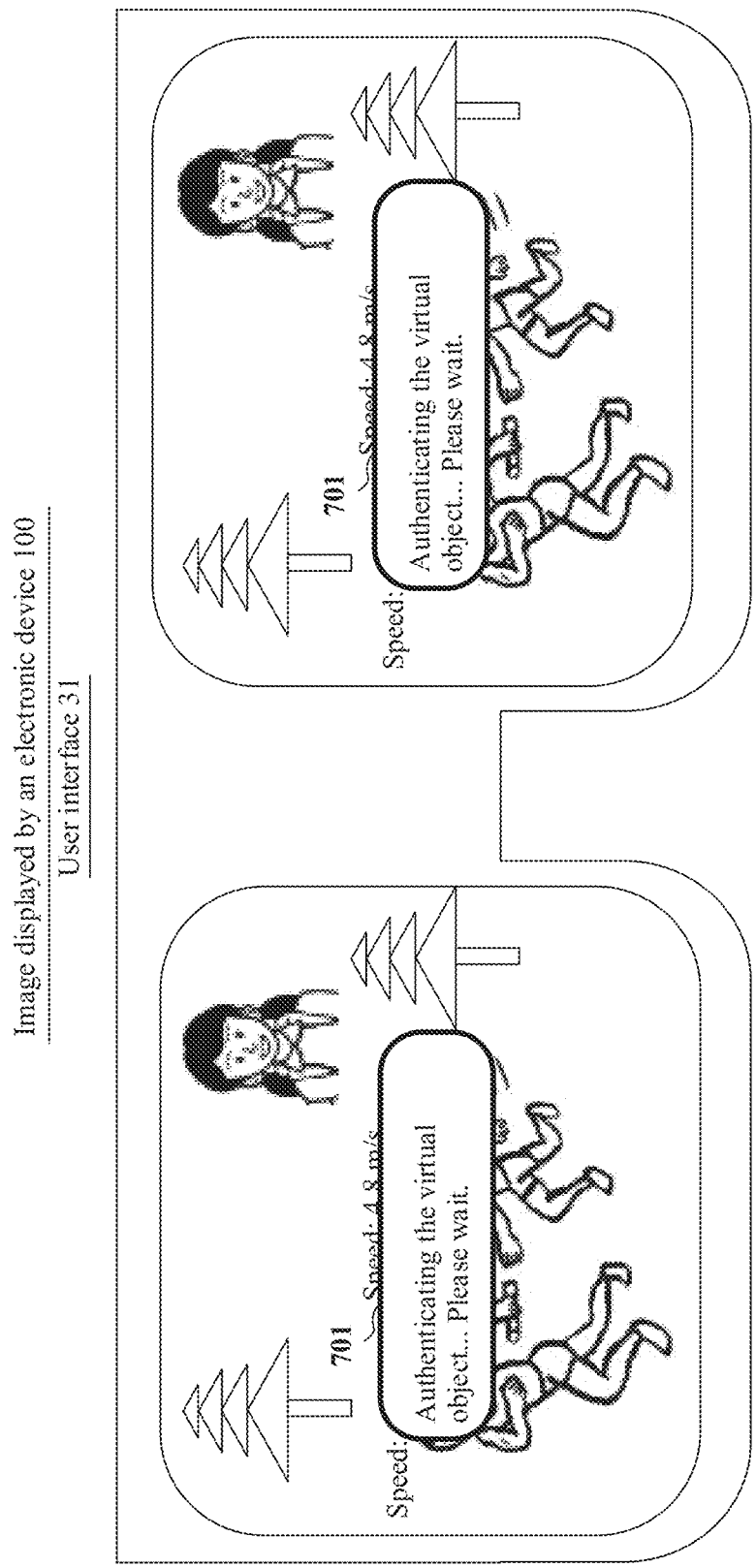
Figure 7B:
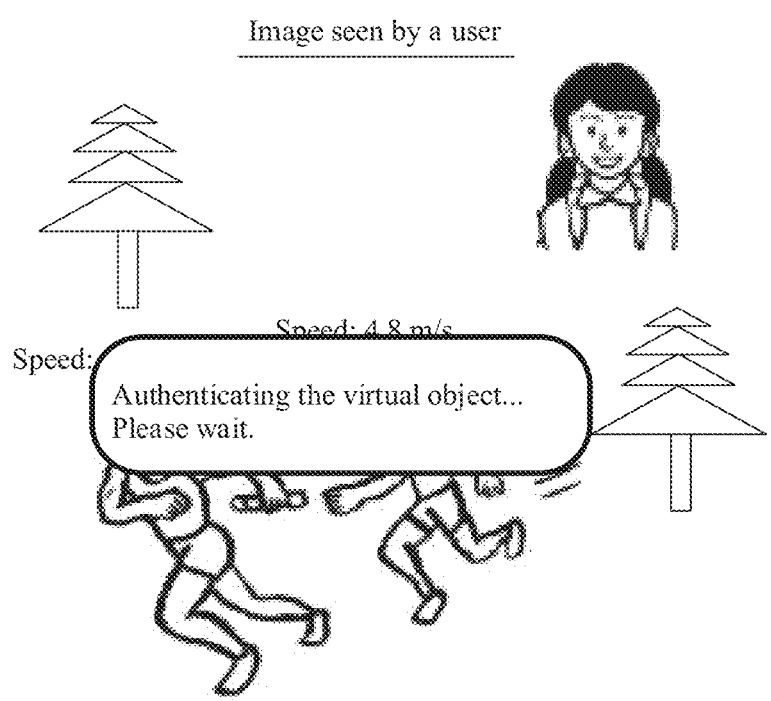

Refer to FIG. 7A. FIG. 7A shows possible prompt information displayed on a display by the electronic device 100. As shown in FIG. 7A, the electronic device 100 may display a window 701 in the provided user interface 31. The window 701 includes text information "Authentication is being performed on the simulation object, please wait . . . ", and the text information may be used to prompt the user that the authentication operation is currently being performed. Refer to FIG. 7B. FIG. 7B is an image seen by the user when the electronic device 100 displays the user interface 31 shown in FIG. 7A. In some embodiments, the window 701 automatically disappears after being displayed on the display of the electronic device 100 for a period of time, without user interaction.

This is not limited to the window 701 shown in FIG. 7A. The electronic device 100 may further display prompt information in another form on the display, for example, an icon or an animation, to prompt the user that the authentication operation is currently being performed. This is not limited in this embodiment of this application.

2. The electronic device 100 may prompt, by using a voice, a blinking indicator, a vibration, or the like, the user that the authentication operation is currently being performed.

Specifically, the electronic device 100 may further prompt, by playing a voice "authentication being performed" by using the speaker 170A, controlling the indicator to blink, controlling the motor to vibrate, or the like, the user that the authentication operation is currently being performed.

In this embodiment of this application, any piece of information that is output by the electronic device 100 and that is used to prompt that the authentication operation is currently being performed may be referred to as second prompt information. In other words, the second prompt information may include but is not limited to a visual element displayed by the electronic device 100, a voice, an indicator feedback, or a vibration feedback.

After performing the authentication operation on the displayed simulation object, the electronic device 100 may determine whether the simulation object is valid.

In some embodiments, after performing the authentication operation on the one or more simulation objects, the electronic device 100 may notify the user of an authentication result. In other words, the electronic device 100 may prompt the user whether the one or more simulation objects are valid. Manners in which the electronic device 100 prompts the user whether the one or more simulation objects are valid may include the following several manners.

1. The electronic device 100 may display prompt information on the display, where the prompt information is used to prompt the user whether the simulation object is valid.

Figure 8A:
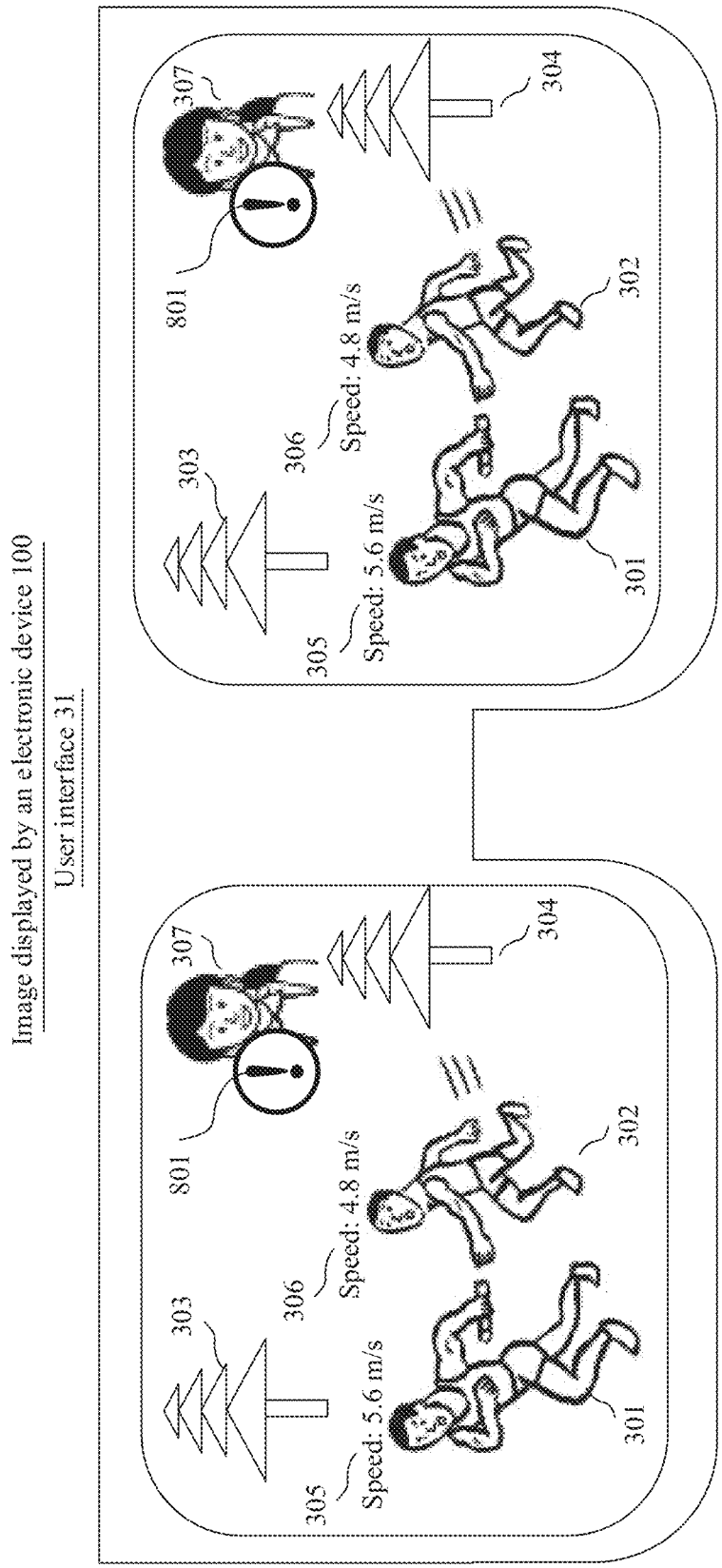
Figure 8B:
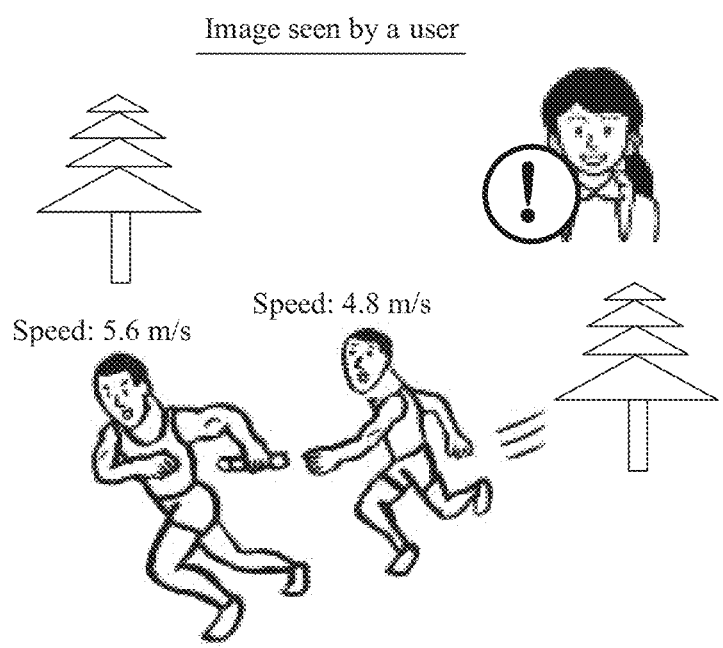

Refer to FIG. 8A, FIG. 8A shows possible prompt information displayed on a display by the electronic device 100. As shown in FIG. 8A, the electronic device 100 may display an icon 801 in the provided user interface 31. The icon 801 may be used to prompt a user that the simulation object 307 is invalid. In some embodiments, the icon 801 automatically disappears after being displayed on the display of the electronic device 100 for a period of time, without user interaction. Refer to FIG. 8B. FIG. 8B is an image seen by a user. When the electronic device 100 displays the user interface shown in FIG. 8A. This is not limited to the icon 801 shown in FIG. 8A. The electronic device 100 may further display prompt information in another form on the display, for example, a text or an animation, to prompt the user whether the simulation object is valid. This is not limited in this embodiment of this application.

2. The electronic device 100 may prompt, by using a voice, a blinking indicator, a vibration, or the like, whether the simulation object is valid.

For example, the electronic device 100 may prompt the user that the simulation object is valid by playing a voice "valid" by using the speaker 170C, and prompt the user that the simulation object is invalid by playing a voice "invalid" by using the speaker 170C. For another example, the electronic device 100 may control the indicator to blink once to prompt the user that the simulation object is valid, and control the indicator to blink twice to prompt the user that the simulation object is invalid. For another example, the electronic device 100 may control the motor to output a vibration to prompt the user that the simulation object is valid, and control the motor to output two vibrations to prompt the user that the simulation object is invalid.

In this embodiment of this application, any piece of information that is output by the electronic device 100 and that is used to prompt whether the simulation object is valid may be referred to as first prompt information. In other words, the first prompt information may include but is not limited to a visual element displayed by the electronic device 100, a voice, an indicator feedback, or a vibration feedback.

An authentication result of the simulation object is prompted to the user in any one of the foregoing manners, so that the user can learn whether the currently seen simulation object is valid. If the currently displayed simulation object is invalid, alertness of the user may be improved, and the user may be prevented from disclosing personal information (for example, disclosing a home address or a phone number) or performing an insecure operation (for example, clicking an insecure website or a link) under inducement of the simulation object. In this way, user privacy is protected and use security of the electronic device is improved.

After the electronic device 100 prompts the user of the authentication result of the simulation object in any one of the foregoing manners, the user may learn whether the simulation object is valid. In some embodiments, the user may choose to perform further processing on the invalid simulation object. The processing may include shielding and/or reporting. The following describes several methods of shielding or reporting invalid emulation objects.

Figure 9A:
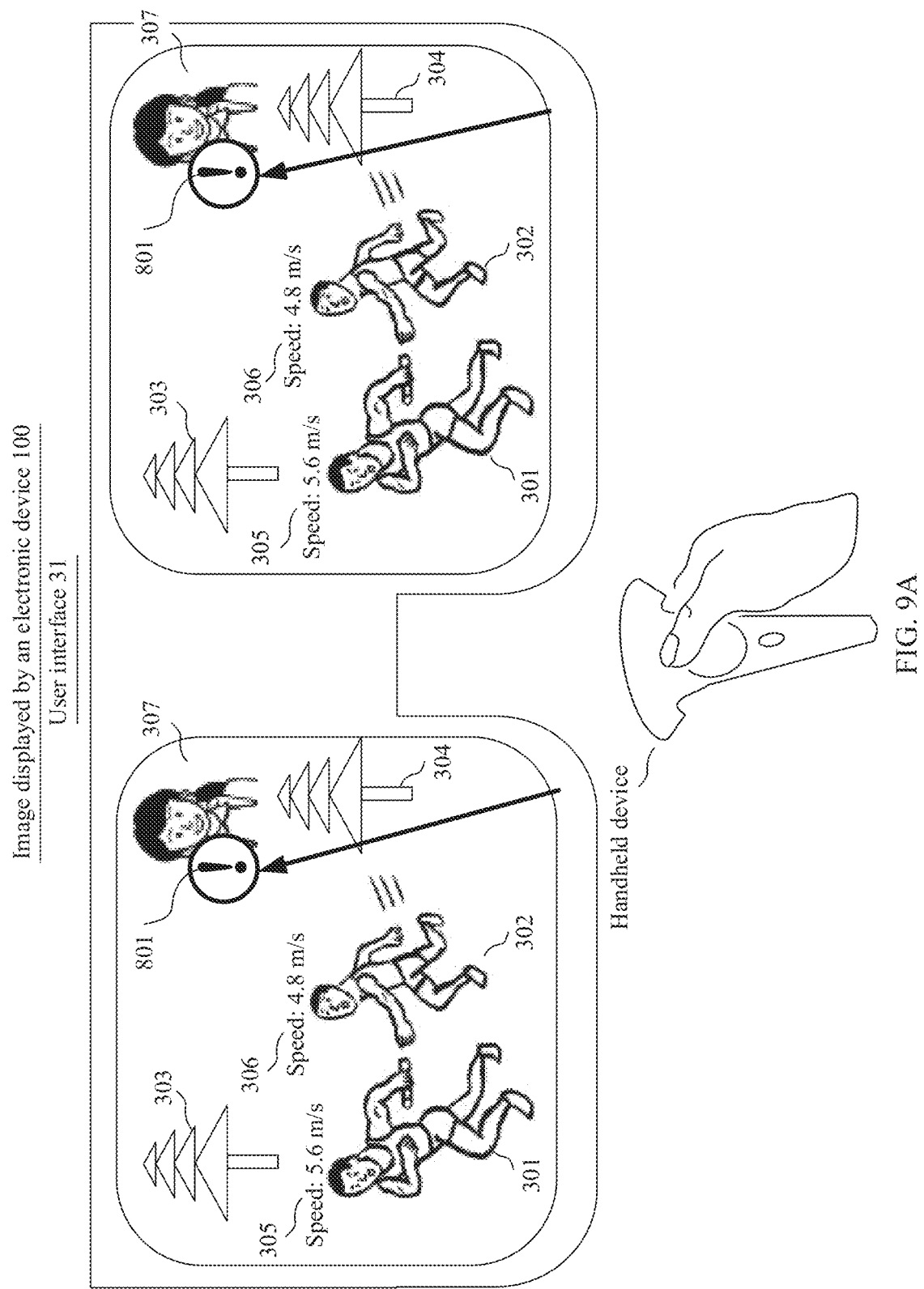
Figure 9B:
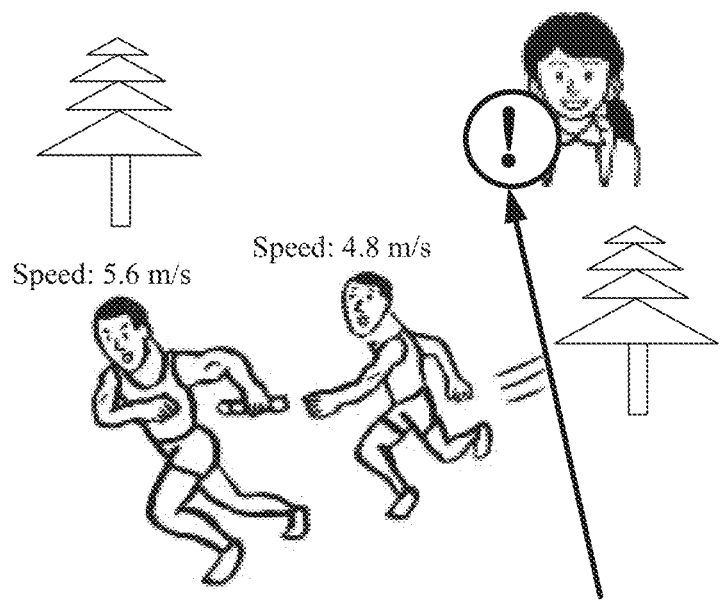
Figure 9C:
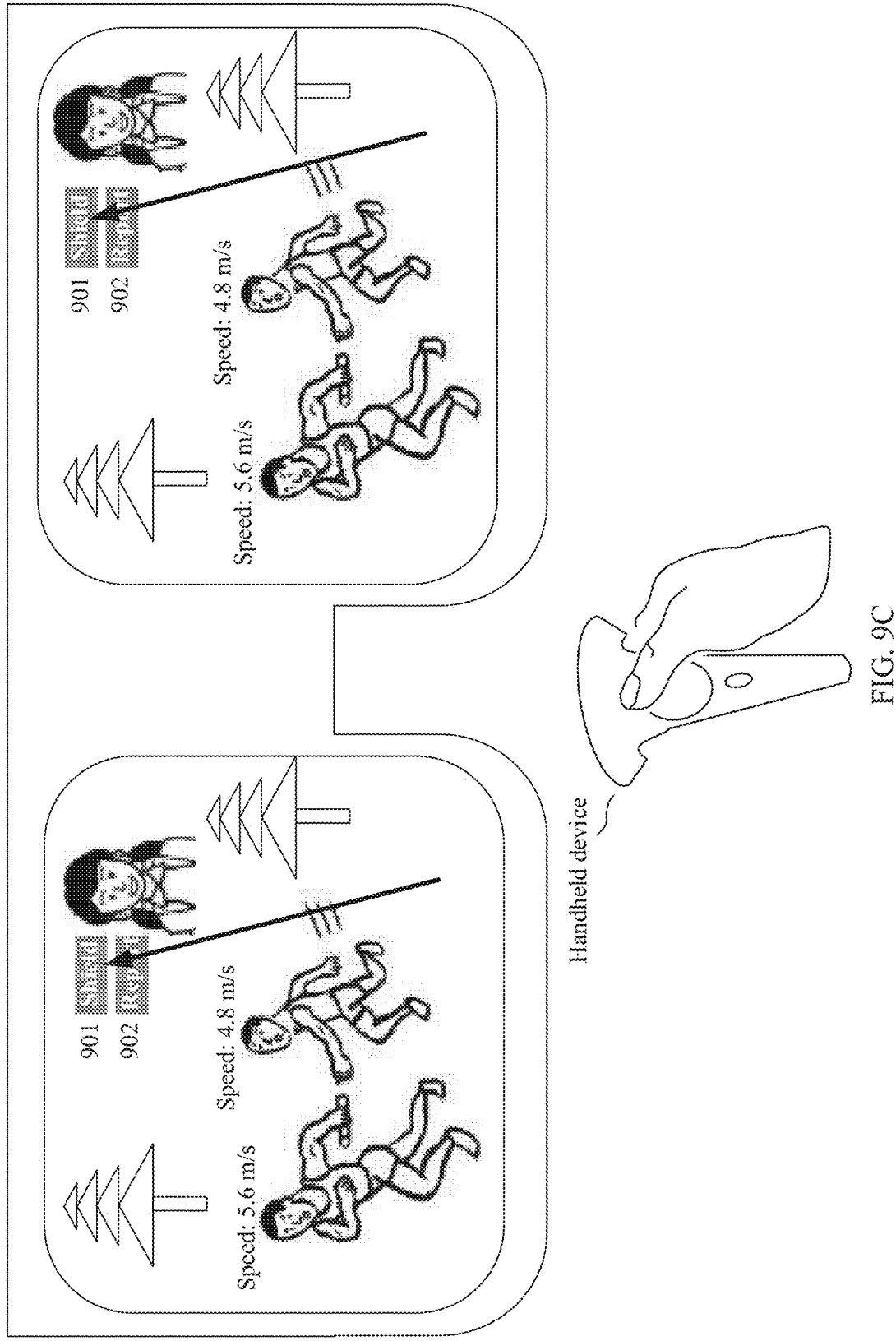

Refer to FIG. 9A and FIG. 9C. When detecting a user operation performed on the icon 801 in the user interface 31 shown in FIG. 9A, in response to the operation, the electronic device 100 displays one or more of the following controls in the user interface 31: a control 901 and a control 902. In other words, the electronic device 100 displays a user interface shown in FIG. 9C. The user interface 31 shown in FIG. 9A is the same as the user interface 31 shown in FIG. 8A. For the user interface 31, refer to related descriptions. Herein, the user operation performed on the icon 801 may include a user operation (for example, a pressing operation or a touch operation) entered by the user on a button disposed on the electronic device 100 or the handheld device after the user selects or directs to the icon 801 by using a hand movement or an eyeball movement, an operation in which user's eyes gaze at the icon 801 for a long time, one or more blinking operations entered when user's eyes gaze at the icon 801, a voice instruction entered by the user, or the like. For specific implementation in which the user selects or directs to the icon 801 by using the hand movement or the eye movement, refer to related descriptions about selecting or directing to the simulation object by the user by using the hand movement or the eye movement in the foregoing embodiment.

Refer to FIG. 9C. In the user interface 31 shown in FIG. 9C, the control 901 may receive a user operation, and in response to the user operation performed on the control 901, the electronic device 100 stops displaying the simulation object 307 on the display. In other words, the electronic device 100 shields the simulation object 307. Herein, the user operation performed on the control 901 may include a user operation (for example, a pressing operation or a touch operation) entered on a button disposed on the electronic device 100 or the handheld device after the user selects or directs to the control 901 by using a hand movement or an eyeball movement, an operation in which user's eyes gaze at the control 901 for a long time, one or more blinking operations entered when the user's eyes gaze at the control 901, a voice instruction entered by the user, or the like. For specific implementation in which the user selects or directs to the control 901 by using the hand movement or the eye movement, refer to related descriptions about selecting or directing to the simulation object by the user by using the hand movement or the eye movement in the foregoing embodiment.

Refer to FIG. 9C. In the user interface 31 shown in FIG. 9C, the control 902 may receive the user operation, and in response to the user operation performed on the control 902, the electronic device 100 reports the simulation object 307. That the electronic device 100 reports the simulation object 307 means that the electronic device 100 sends an identifier of the simulation object 307 to an authentication server 300. In some embodiments, the authentication server 300 may store an identifier of an invalid simulation object reported by the electronic device 100. When receiving an authentication request of another electronic device for a simulation object, if an identifier of the simulation object is the same as the stored identifier of the invalid simulation object, the authentication server 300 may directly feed back an authentication result that the simulation object is invalid to the another electronic device.

Herein, the user operation performed on the control 902 may include a user operation (for example, a pressing operation or a touch operation) entered on a button disposed on the electronic device 100 or the handheld device after the user selects or directs to the control 902 by using a hand movement or an eyeball movement, an operation which user's eyes gaze at the control 902 for a long time, one or m blinking operations entered when the user's eyes gaze at the control 902, a voice instruction entered by the user, or the like. For specific implementation in which the user selects or directs to the control 902 by using the hand movement or the eye movement, refer to related descriptions about selecting or directing to the simulation object by the user by using the hand movement or the eye movement in the foregoing embodiment.

Figure 9D:
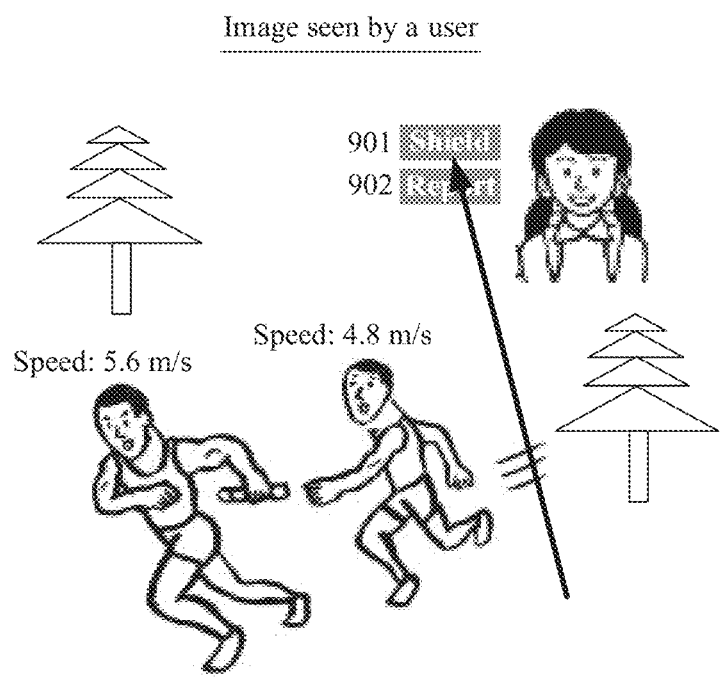

Refer to FIG. 9B. FIG. 9B is an image seen 1w a user when the electronic device 100 displays the user interface shown in FIG. 9A. Refer to FIG. 9D. FIG. 9D is an image seen by a user when the electronic device 100 displays the user interface shown in FIG. 9C.

This is not limited to the manners shown in FIG. 9A and FIG. 9C in which the invalid simulation object is shielded or reported. In some other embodiments of this application, the electronic device 100 may alternatively shield or report the invalid simulation object in another manner. For example, the user may further input a simulated cross drawing gesture on the simulation object 307, to trigger the electronic device 100 to report the simulation object 307. For another example, the user may further input a simulated circle drawing gesture on the simulation object 307, to trigger the electronic device 100 to shield the simulation object 307.

In this embodiment of this application, any one of the foregoing operations used to trigger the electronic device to shield the invalid simulation object may be referred to as a second operation. In other words, the second operation may include but is not limited to: a gesture input performed on the invalid simulation object, a blinking operation performed on the invalid simulation object, a gaze operation performed on the invalid simulation object (for example, a gaze operation exceeding preset duration), or a voice instruction used to shield the invalid emulation object.

In this embodiment of this application, any one of the foregoing operations used to trigger the electronic device to report the invalid simulation object may be referred to as a third operation. In other words, the third operation may include but is not limited to: a gesture input performed on the invalid simulation object, a blinking operation performed on the invalid simulation object, a gaze operation performed on the invalid simulation object (for example, a gaze operation exceeding preset duration), or a voice instruction used to report the invalid emulation object.

In some other embodiments, after performing the authentication operation on the one or more simulation objects, the electronic device 100 may not notify the user of the authentication result. In other words, the electronic device 100 may not prompt the user whether the one or more simulation objects are valid, and actively perform further processing on the invalid simulation objects. The processing may include shielding and/or reporting.

Figure 10A:
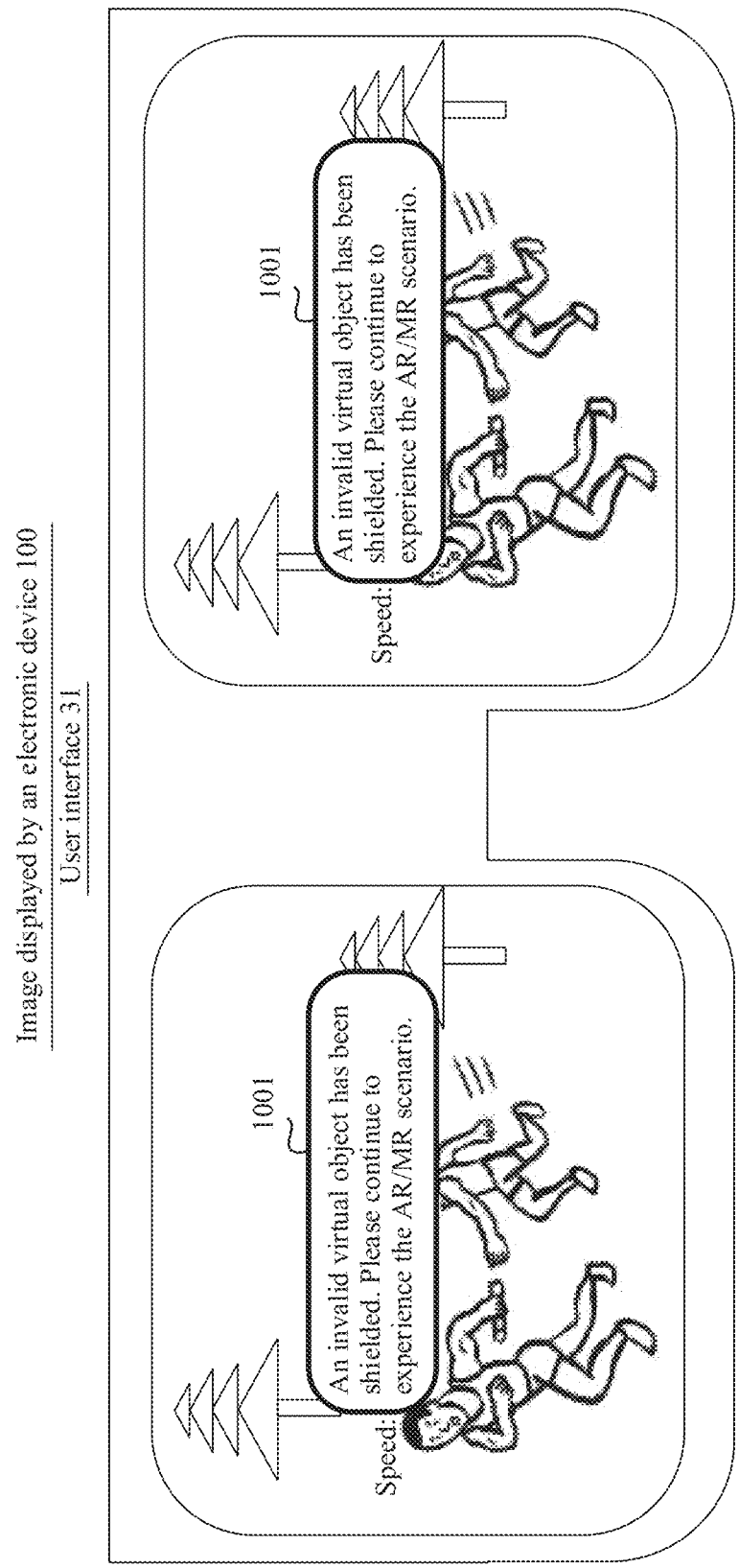

Refer to FIG. 10A. The user interface 31 shown in FIG. 10A is an interface displayed after the electronic device 100 shields an invalid simulation object. As shown in FIG. 10A, the electronic device 100 stops displaying an invalid simulation object (namely, the simulation person 307) on a display.

Figure 10B:
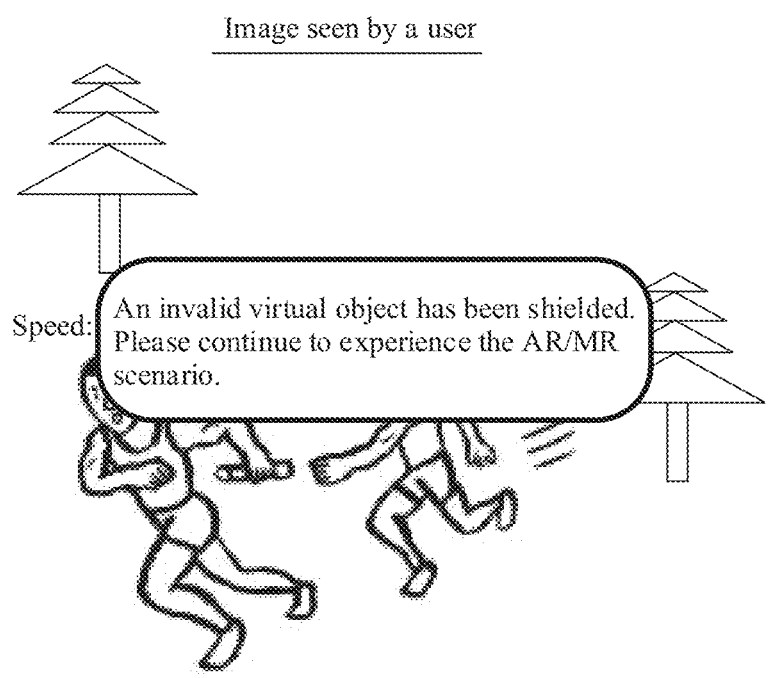

In some embodiments, after shielding the invalid simulation object, the electronic device 100 may prompt the user that the electronic device 100 has shielded the invalid simulation object. Refer to FIG. 10A. FIG. 10A shows a manner in which the electronic device 100 prompts a user. As shown in FIG. 10A, the electronic device 100 may display a window 1001 on the display. The window 1001 includes prompt information. (For example, text message "An invalid simulation object has been shielded. Please continue to experience the AR/MR scenario.") Refer to FIG. 10B. FIG. 10B is an image seen by a user when the electronic device 100 displays the user interface 31 shown in FIG. 10A. This is not limited to the window 1001 shown in FIG. 10A. The electronic device 100 may further display prompt information in another form on the display, for example, an icon or an animation. This is not limited to the prompt information displayed on the display. The electronic device 100 may further notify, by using a voice, vibration, a flash, or the like, the user that the electronic device 100 has shielded an invalid simulation object. This is not limited in this embodiment of this application.

Figure 11A:
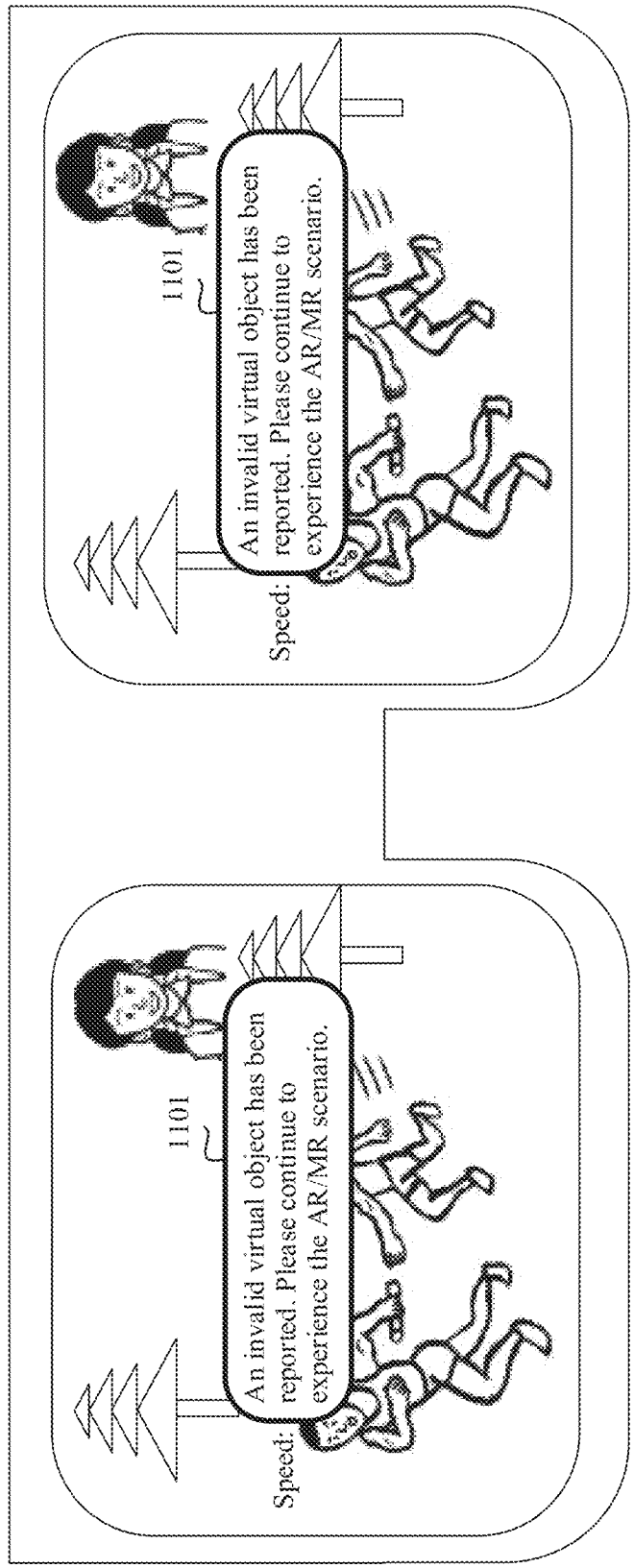
Figure 11B:
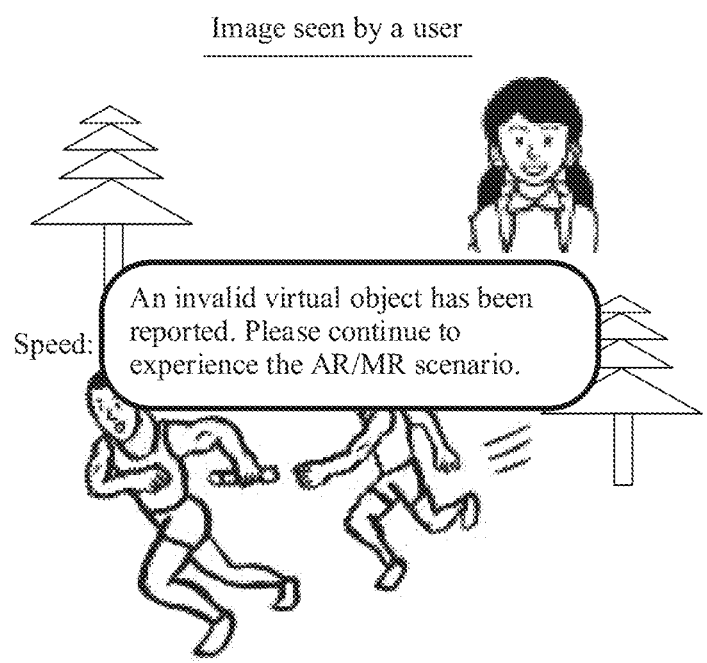

In some embodiments, after reporting the invalid simulation object, the electronic device 100 may prompt the user that the electronic device 100 has reported the invalid simulation object. Refer to FIG. 11A FIG. 11A shows a manner in which the electronic device 100 prompts a user. As shown in FIG. 11A, the electronic device 100 may display a window 1101 on a display. The window 1101 includes prompt information. (For example, text message "An invalid emulation object has been reported successfully. Please continue to experience the AR/MR scenario.") Refer to FIG. 11B. FIG. 11B is an image seen by a user when the electronic device 100 displays the user interface 31 shown in FIG. 11A. This is not limited to the window 1101 shown in FIG. 11A. The electronic device 100 may further display prompt information in another form on the display, for example, an icon or an animation. This is not limited to the prompt information displayed on the display. The electronic device 100 may further notify, by using a voice, vibration, a flash, or the like, the user that the electronic device 100 has shielded an invalid simulation object. This is not limited in this embodiment of this application.

This is not limited to the foregoing AR/MR display scenarios shown in FIG. 3A to FIG. 3C, FIG. 4A and FIG. 4B, FIG. 5A and FIG. 5B, FIG. 6A and FIG. 6B, FIG. 7A and FIG. 7B, FIG. 8A and FIG. 8B, FIG. 9A to FIG. 9D, FIG. 10A and FIG. 10B and FIG. 11. A and FIG. 11B. The simulation object recognition method in this embodiment of this application may be further applied to a VR display scenario. In other words, when providing the VR display scenario for the user, the electronic device 100 may also implement the simulation object recognition method provided in this embodiment of this application.

This is not limited to the foregoing simulation objects directly displayed on the display shown in FIG. 3A to FIG. 3C, FIG. 4A and FIG. 4B, FIG. 5A and FIG. 5B, FIG. 6A and FIG. 6B, FIG. 7A and FIG. 7B, FIG. 8A and FIG. 8B, FIG. 9A to FIG. 9D, and FIG. 10A and FIG. 10B, and FIG. 11A and FIG. 11B. In some embodiments, the electronic device may be configured with an optical apparatus. The optical apparatus may project an optical signal onto the retinas of the user, so that the user can see the simulation objects by using the electronic device 100. For example, for this, refer to FIG. 5B. The light beam that is in the arrow shape in FIG. 5B and that is used to prompt the user to direct to the simulation object may be an object seen by the user after the optical apparatus projects the optical signal onto the retinas of the user. For another example, for this, refer to FIG. 8A. The icon 801 that is shown in FIG. 8A and that is used to prompt the user that the simulation object 307 is invalid may be an object seen by the user after the optical apparatus projects the optical signal onto the retinas of the user.

The following describes a process in which the electronic device 100 performs authentication on the simulation object according to an embodiment of this application. In other words. The following describes a process in which the electronic device 100 identifies whether the simulation object is valid.

Figure 12:
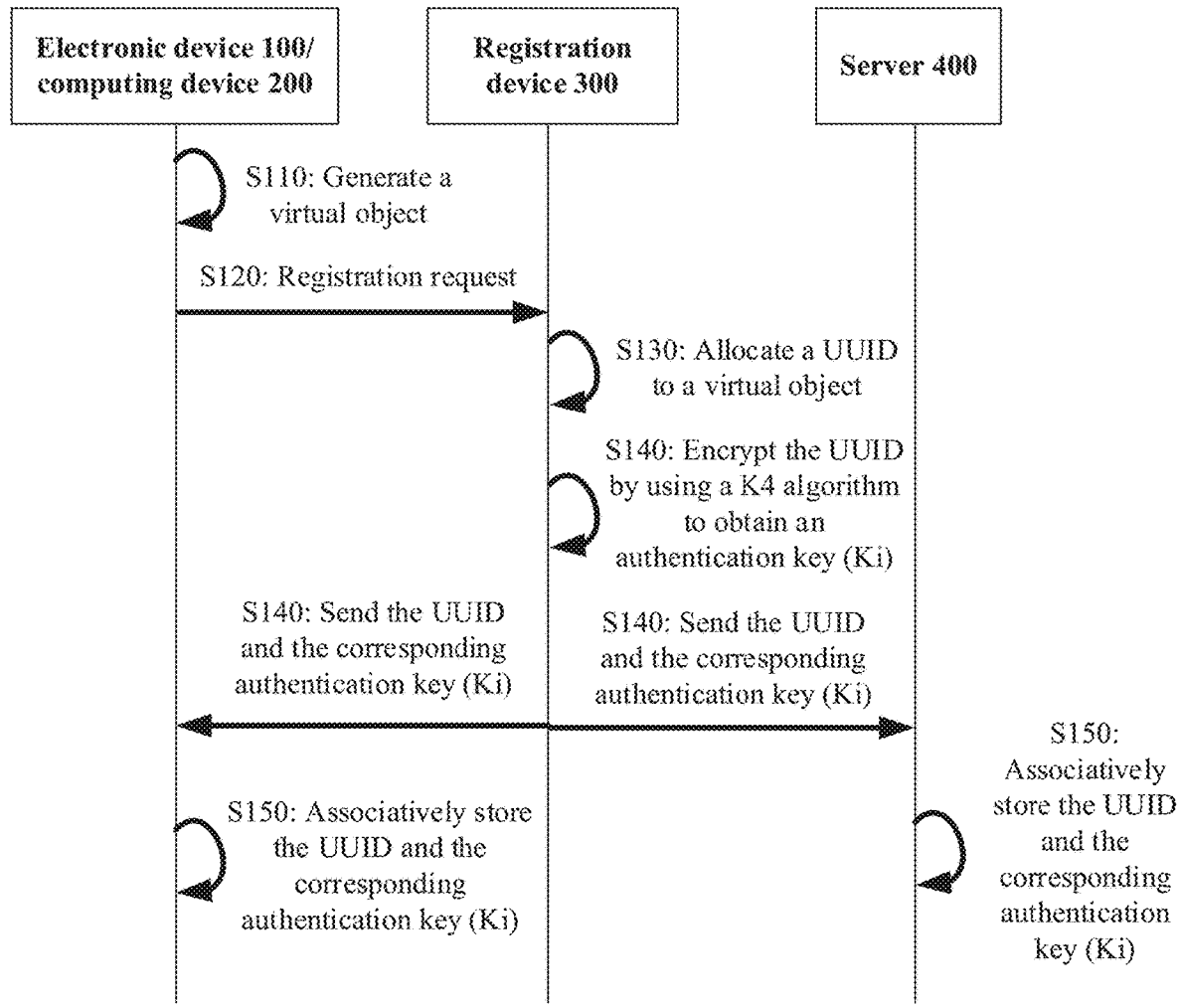
FIG. 12 is a schematic diagram of a registration process of a simulation object according to an embodiment of this application.

In this embodiment of this application, all valid simulation objects are pre-registered with a registration device, and the registration device allocates an identifier to the valid simulation objects, where the identifier is used for authentication. FIG. 12 shows an example of a registration process of a valid simulation object according to an embodiment of this application. As shown in the FIG. 12, the registration process may include the following steps.

Step S110: The electronic device 100 or the computing device 200 generates a simulation object.

Step S120: The electronic device 100 or the computing device 200 sends a registration request to the registration device 300.

Step S130: The registration device 300 allocates an identifier to the simulation object in response to the registration request.

In some embodiments, the identifier allocated by the registration device 300 to the simulation object may be a uniquely unique identifier (universally unique identifier, UUID).

Step S140: The registration device 300 encrypts the identifier by using a first algorithm to obtain a key value, and separately sends the identifier and the key value to the electronic device 100 and the server 400.

In some embodiments, the first algorithm may be a K4 algorithm, and the key value obtained after the identifier of the simulation object is encrypted by using the first algorithm is an authentication key (Ki).

In step S140, the registration device 300 transmits a specific value, which can avoid disclosing of the first algorithm.

Step S150: The electronic device 100 and the server 400 associatively store the identifier of the simulation object and the key value.

In the foregoing registration process, the registration device and the server 400 associatively store the identifier of the valid emulation object and the corresponding key value.

Figure 13:
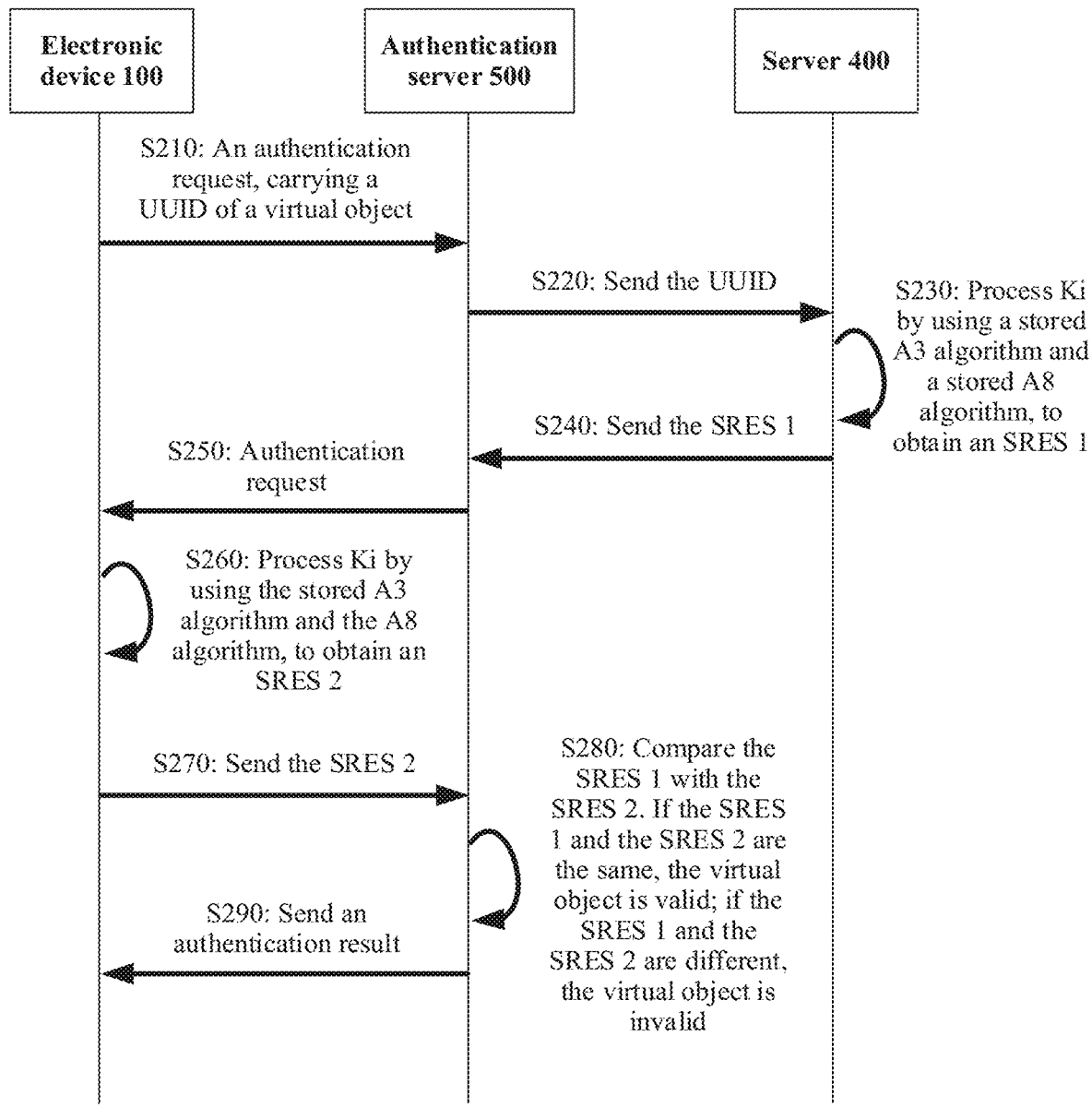
FIG. 13 is a schematic diagram of an authentication process of a simulation object according to an embodiment of this application.

Refer to FIG. 13. FIG. 13 shows a process in which the electronic device 100 performs authentication on a simulation object according to an embodiment of this application. For a time when the electronic device 100 performs authentication on the simulation object, refer to related descriptions in the foregoing embodiments. As shown in FIG. 13, the authentication process may include the following steps.

Step S210: The electronic device 100 sends an authentication request to the authentication server 500, where the authentication request carries an identifier of a simulation object on which the electronic device 100 requests authentication.

The identifier of the simulation object may be a universally unique identifier (universally unique identifier) UUID. If the simulation object is valid, the UUID of the simulation object may be allocated by a registration device to the simulation object.

Step S220: The authentication server 500 receives the authentication request, and sends the identifier of the simulation object to the server 400.

Step S230: The server 400 searches for a key value corresponding to the identifier of the simulation object, and calculates the key value by using at least a second algorithm and/or a third algorithm, to generate a first authentication response value.

The server 400 stores the identifier of the valid emulation object and the corresponding key value. The identifier of the valid emulation object and the corresponding key value may be delivered by the registration device to the server 400. The key value may be a value obtained after the identifier is calculated by using the first algorithm. The key value corresponding to the identifier of the valid emulation object may be an authentication key Ki.

The first authentication response value may be a sign response (sign response, SRES).

Step S240: The server 400 sends the first authentication response value to the authentication server 500.

Step S250: The authentication server 500 receives the first authentication response value, and sends an authentication request to the electronic device 100.

Step S260: The electronic device 100 receives the authentication request, searches for a key value corresponding to the identifier of the simulation object, and calculates the key value by using the second algorithm and the third algorithm, to generate a second authentication response value.

The electronic device 100 is the same as the server 400, and also stores the identifier of the valid simulation object and the corresponding key value. The identifier of the valid emulation object and the corresponding key value may be delivered by the registration device to the server 400. The key value may be a value obtained after the identifier is calculated by using the first algorithm. In some embodiments, the first algorithm may be a K4 algorithm, and the key value corresponding to the identifier of the valid emulation object may be an authentication key Ki.

In some embodiments, the second algorithm may be an A3 algorithm, and the third algorithm may be an A8 algorithm. The second authentication response value may be a sign response (sign response, SRES).

Step S270: The electronic device 100 sends the second authentication response value to the authentication server 500.

Step S280: The authentication server 500 receives the second authentication response value, and compares the first authentication response value with the second authentication response value, if the first authentication response value and the second authentication response value are the same, the simulation object is valid; if the first authentication response value and the second authentication response value are different, the simulation object is invalid.

The foregoing step S240 and step S280 are specific values, so that disclosing of the second algorithm and the third algorithm can be avoided.

Step S290: The authentication server 500 sends an authentication result to the electronic device 100.

It may be understood that the first algorithm, the second algorithm, and the third algorithm mentioned above are merely examples. In some other embodiments of this application, the first algorithm, the second algorithm, and the third algorithm may alternatively be replaced with another algorithm.

When the electronic device 100 authenticates an invalid simulation object, the invalid simulation object may also have a corresponding identifier. However, because the invalid simulation object does not undergo a registration process, and the electronic device 100 cannot learn the first algorithm, the key value of the invalid simulation object stored in the electronic device 100 is invalid. Similarly, because the invalid simulation object does not undergo the registration process, and the server 400 cannot learn the first algorithm, the key value of the invalid simulation object stored in the server 400 is also invalid. In the authentication process, for the invalid simulation object, a first authentication response value calculated by the electronic device 100 is different from a second authentication response value calculated by the server 400, and the authentication server 500 may determine that the simulation object is invalid.

The authentication process shown in FIG. 12 is not limited to the authentication process, and the simulation object may be authenticated in another manner. This is not limited in this embodiment of this application. For example, an effective international mobile subscriber identity (international mobile subscriber identity, IMSI) in a technology such as a universal mobile telecommunications system (universal mobile telecommunications system) or a long term evolution (long term evolution, LTE) is used to authenticate the simulation object.

It can be learned from the foregoing embodiments that, by implementing the technical solutions provided in this application, alertness of the user can be improved, operation security of the user can be ensured, disclosing of user privacy is avoided, and use security of the electronic device can be improved.

The implementation of this application may be randomly combined to achieve different technical effects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the process or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

In short, the foregoing descriptions are only embodiments of the technical solutions of the present invention, but are not intended to limit the protection scope of the present invention. Any modification, equivalent replacement, and improvement made according to the disclosure of the present invention shall fall within the protection scope of the present invention.

What is claimed is:

1. A simulation object identity recognition method implemented by an electronic device, wherein the simulation object identity recognition method comprises:
    displaying a simulation object, wherein the simulation object is a virtual image;
    detecting a first operation performed on the simulation object;
    making a determination, in response to the first operation, whether the simulation object is valid;
    outputting, in response to the determination, first prompt information indicating whether the simulation object is valid, wherein the simulation object is valid when the simulation object is registered with a registration device corresponding to the electronic device;
    detecting, in response to the simulation object being an invalid simulation object, a second operation performed on the simulation object, wherein the simulation object is invalid when the simulation object is not registered with the registration device; and
    stopping displaying, in response to the second operation, the simulation object.

2. The simulation object identity recognition method of claim 1, further comprising:
    displaying the simulation object using a display screen of the electronic device; or
    projecting, using an optical apparatus, an optical signal corresponding to the simulation object.

3. The simulation object identity recognition method of claim 1, wherein before displaying the simulation object, the simulation object identity recognition method further comprises:
    generating the simulation object; or
    obtaining, from a computing device, the simulation object.

4. The simulation object identity recognition method of claim 1, wherein the first prompt information comprises at least one of:
    visual information displayed by a display screen of the electronic device;
    a voice;
    indicator feedback; or
    vibration feedback.

5. The simulation object identity recognition method of claim 1, wherein the first operation comprises at least one of a gesture input performed on the simulation object or a blinking operation performed on the simulation object.

6. The simulation object identity recognition method of claim 1, wherein the first operation comprises at least one of a gaze operation performed on the simulation object or a voice instruction indicating whether the simulation object is valid.

7. The simulation object identity recognition method of claim 1, further comprising outputting second prompt information indicating that the electronic device is determining whether the simulation object is valid.

8. The simulation object identity recognition method of claim 7, wherein the second prompt information comprises at least one of:
    a visual element displayed by a display screen of the electronic device;
    a voice;
    indicator feedback; or
    vibration feedback.

9. The simulation object identity recognition method of claim 1, further comprising:
    displaying a physical object; and
    outputting third prompt information indicating that the simulation object is the virtual image or outputting fourth prompt information indicating that an object corresponding to the physical object exists in a real world.

10. The simulation object identity recognition method of claim 1, further comprising:
    sending an identifier of the simulation object to an authentication server;
    receiving, from the authentication server, an authentication result indicating whether the simulation object is valid; and
    determining, based on the authentication result, whether the simulation object is valid.

11. The simulation object identity recognition method of claim 1, wherein the simulation object comprises one or more of a simulation person, a simulation animal, a simulation tree, or a simulation building.

12. A simulation object recognition method implemented by a head wearable device, wherein the simulation object recognition method comprises:
    displaying a simulation object and a physical object, wherein the simulation object is a virtual image;
    detecting a first operation performed on the simulation object;
    determining, in response to the first operation, whether the simulation object is valid;
    outputting prompt information indicating that the head wearable device is determining whether the simulation object is valid;
    outputting second prompt information indicating whether the simulation object is valid;
    detecting, in response to the simulation object being an invalid simulation object, a second operation performed on the simulation object; and
    stopping displaying, in response to the second operation, the simulation object,
    wherein the simulation object is valid when the simulation object is registered with a registration device corresponding to the head wearable device, and
    wherein the simulation object is invalid when the simulation object is not registered with the registration device.

13. The simulation object recognition method of claim 12, wherein the first operation comprises at least one of:
    a gesture input performed on the simulation object;
    a blinking operation performed on the simulation object;
    a gaze operation performed on the simulation object; or
    a voice instruction indicating whether the simulation object is valid.

14. An electronic device comprising:
    a display screen;
    a memory coupled to the display screen and configured store computer instructions; and
    a processor coupled to the display screen and the memory, wherein when executed by the processor, the computer instructions cause the electronic device to:
        display a simulation object, wherein the simulation object is a virtual image;
        detect a first operation performed on the simulation object;

make a determination, in response to the first operation, whether the simulation object is valid;

output, in response to the determination, prompt information indicating whether the simulation object is valid, wherein the simulation object is valid when the simulation object is registered with a registration device corresponding to the electronic device;

detect, in response to the simulation object being an invalid simulation object, a second operation performed on the simulation object, wherein the simulation object is invalid when the simulation object is not registered with the registration device; and stop display, in response to the second operation, the simulation object.

15. The electronic device of claim 14, wherein when executed by the processor, the computer instructions further cause the electronic device to:

display the simulation object using the display screen; or project, using an optical apparatus, an optical signal corresponding to the simulation object.

16. The electronic device of claim 14, wherein when executed by the processor, the computer instructions further cause the electronic device to:

generate the simulation object; or obtain the simulation object from a computing device.

17. The electronic device of claim 14, wherein the prompt information comprises at least one of:

visual information displayed by the display screen;

a voice;

indicator feedback; or vibration feedback.

18. The electronic device of claim 14, wherein the first operation comprises any one of a gesture input performed on the simulation object or a blinking operation performed on the simulation object.

19. The electronic device of claim 14, wherein the first operation comprises any one of a gaze operation performed on the simulation object or a voice instruction indicating whether the simulation object is valid.

20. The electronic device of claim 14, wherein the simulation object comprises one or more of a simulation person, a simulation animal, a simulation tree, or a simulation building.

* * * * *